(12) United States Patent
Tessier

(10) Patent No.: US 7,443,300 B2
(45) Date of Patent: Oct. 28, 2008

(54) ANTENNAS FOR OBJECT IDENTIFIERS IN LOCATION SYSTEMS

(75) Inventor: Paul Tessier, Lynnfield, MA (US)

(73) Assignee: Radianse, Inc., Andover, MA (US)

( * ) Notice: Subject to any disclaimer, the term of this patent is extended or adjusted under 35 U.S.C. 154(b) by 287 days.

(21) Appl. No.: 11/320,212

(22) Filed: Dec. 27, 2005

(65) Prior Publication Data

US 2006/0238350 A1    Oct. 26, 2006

Related U.S. Application Data

(60) Provisional application No. 60/639,464, filed on Dec. 27, 2004.

(51) Int. Cl.
*G08B 13/14* (2006.01)

(52) U.S. Cl. .................. 340/572.7; 340/10.1; 343/788; 343/866

(58) Field of Classification Search ............... 340/572.7
See application file for complete search history.

(56) References Cited

U.S. PATENT DOCUMENTS

| | | | | |
|---|---|---|---|---|
| 6,069,564 A | * | 5/2000 | Hatano et al. ............ | 340/572.7 |
| 6,300,914 B1 | * | 10/2001 | Yang ........................... | 343/741 |
| 6,362,727 B1 | | 3/2002 | Guy, Jr. | |
| 6,362,737 B1 | * | 3/2002 | Rodgers et al. .......... | 340/572.1 |
| 6,429,820 B1 | * | 8/2002 | Thursby et al. ............. | 343/744 |
| 7,271,726 B2 | * | 9/2007 | Hollon .................... | 340/572.7 |
| 2003/0090424 A1 | * | 5/2003 | Brune et al. ................ | 343/741 |

OTHER PUBLICATIONS

International Search Report for Application No. PCT/US05/47159, dated Dec. 4, 2007.

* cited by examiner

*Primary Examiner*—George A Bugg
(74) *Attorney, Agent, or Firm*—Lahive & Cockfield, LLP; Anthony A. Laurentano, Esq.

(57) ABSTRACT

Transmitters or object identifiers are discloses that are able to radiate consistent power regardless of the object where the transmitters or object identifiers are placed. The transmitter or object identifier may include a vertical loop antenna. The loop plane of the vertical loop antenna is substantially perpendicular to the surface of the object where the transmitter or object identifier is placed. The transmitter or object identifier may include a folded vertical loop antenna where the loop plane of the vertical loop antenna is extended and folded to have additional loop planes. The antennas of the present invention enable the transmitter or object identifier to radiate consistent power regardless of the object where the transmitter or object identifier is placed and regardless of the orientation of the transmitter or object identifier.

20 Claims, 24 Drawing Sheets

Horz Loop over Horiz Plane

| | | | |
|---|---|---|---|
| Azimuth Plot | | Cursor Az | 0.0 deg. |
| Elevation Angle | 0.0 deg. | Gain | -26.59 dBi |
| Outer Ring | 0.0 dBi | | -1.11 dBmax |
| | | | -1.22 dBmax3D |
| 3D Max Gain | -25.37 dBi | | |
| Slice Max Gain | -25.48 dBi @ Az Angle = 195.0 deg. | | |
| Front/Back | 1.17 dB | | |
| Beamwidth | ? | | |
| Sidelobe Gain | <-100 dBi | | |
| Front/Sidelobe | >100 dB | | |

Vert Loop over Horiz Plane

Azimuth Plot
Elevation Angle  0.0 deg.
Outer Ring  0.0 dBi

Cursor Az  0.0 deg.
Gain  -15.99 dBi
    -7.84 dBmax
    -1.63 dBPrTrc

3D Max Gain  -4.52 dBi
Slice Max Gain  -8.15 dBi @ Az Angle = 270.0 deg.
Front/Back  7.84 dB
Beamwidth  101.4 deg.; -3dB @ 219.3, 320.7 deg.
Sidelobe Gain  -8.15 dBi @ Az Angle = 90.0 deg.
Front/Sidelobe  0.0 dB TT PCB Rear Fed Over Plane

| | | | |
|---|---|---|---|
| Azimuth Plot | | Cursor Az | 0.0 deg. |
| Elevation Angle | 0.0 deg. | Gain | -16.88 dBi |
| Outer Ring | 0.0 dBi | | -1.88 dBmax |
| | | | -5.93 dBPrTrc |
| 3D Max Gain | -10.25 dBi | | |
| Slice Max Gain | -14.3 dBi @ Az Angle = 235.0 deg. | | |
| Front/Back | 0.52 dB | | |
| Beamwidth | ? | | |
| Sidelobe Gain | -14.64 dBi @ Az Angle = 85.0 deg. | | |
| Front/Sidelobe | 0.34 dB | | |

… # ANTENNAS FOR OBJECT IDENTIFIERS IN LOCATION SYSTEMS

REFERENCE TO RELATED APPLICATIONS

The present invention claims priority to U.S. Provisional Patent Application, Ser. No. 60/639,464, filed Dec. 27, 2004, entitled "ANTENNAS FOR OBJECT IDENTIFIERS IN LOCATION SYSTEMS," the contents of which are incorporated herein by reference.

GOVERNMENT RIGHTS

This invention was made at least in part with government support under grant number R44 RR018076-03 awarded by the National Institutes of Health. The government has certain rights in this invention.

FIELD OF THE INVENTION

The present invention relates to location systems, in particular to antennas for object identifiers in the location systems.

BACKGROUND OF THE INVENTION

It is useful to know the location of people or objects for several reasons. The location of people or objects allows another party to find lost people or objects, such as a child or expensive equipments. Location information can also be used as a piece of data in conjunction with other information. For example, knowledge about the location of a portable laptop computer combined with knowledge about the location of all the printers in a building can allow a system to automatically route a print job from the laptop computer to the nearest printer, thus saving time and aggravation. Additionally, the knowledge of who is in a particular room in a building can also allow a system to adjust the temperature or lighting of that room to the individual's preferences or route that person's telephone calls to the phone in that room. These applications are examples illustrating the utility of a system that allows the location of people or objects to be known.

Conventional location systems are generally based on one of two methods. In the first method, the amount of time is measured for a signal to travel from point A to point B, and then the distance between the two points A and B is calculated. In the second method, the conventional location systems calculate the distance between a transmitter and a receiver based on a received signal strength indication (RSSI). The RSSI is a function of distance and a path-loss factor:

$$RSSI = 1/d^{-f}$$

where d is distance and f is the factor.

While the second method is conceptually simpler than the first method, the second method requires a transmitter or object identifier that has a consistent radiation power characteristic. In the conventional location systems implementing the second method, the transmitter or object identifier employs a horizontal loop antenna. The horizontal loop antennas of the conventional location systems have a loop plane that is parallel to the surface of the object where the transmitter or object identifier is placed. If the transmitter or object identifier is placed on a conductive object, such as equipment with a metal cabinet, the radiated power drops significantly in the conventional location systems.

SUMMARY OF THE INVENTION

There is a need for a transmitter or object identifier in location systems that can radiate signals with consistent power regardless of the object where the transmitter or object identifier is placed. The present invention provides such a transmitter or object identifier that is able to radiate signals with consistent power regardless of the object where the transmitter or object identifier is placed. The present invention provides consistent and isotropic radiation pattern from the transmitter or object identifier so that the signal strength is the same independent of the orientation of the transmitter or object identifier. The present invention enables the signal strength from the transmitter or object identifier to be the same independent of mounting the transmitter or object identifier on conductive objects so that objects of all types and materials can be accurately tracked.

In the present invention, the transmitter or object identifier may include a horizontal circuit board for the circuitry of the transmitter or object identifier. The horizontal circuit board is substantially parallel to the surface of the object where the transmitter or object identifier is placed. The transmitter or object identifier may also include a vertical loop antenna. The loop plane of the vertical loop antenna is substantially perpendicular to the surface of the object where the transmitter or object identifier is placed. In an embodiment of the present invention, the loop plane of the vertical loop antenna may be extended and folded to have additional loop planes. In another embodiment of the present invention, the additional loop planes may also be extended and folded to include further additional loop planes. The antennas of the present invention therefore enable the transmitter or object identifier to radiate signals with consistent power regardless of the object where the transmitter or object identifier is placed and regardless of the orientation of the transmitter or object identifier.

In accordance with one aspect of the present invention, an object identifier is provided for identifying a location of an object in a location system. The object identifier is attached to the object and radiates a signal including information on the location of the object. The object identifier includes a horizontal circuit board formed on a first plane for the circuitry of the object identifier, and a vertical loop antenna formed on a second plane. The first plane is substantially perpendicular to the second plane.

In accordance with another aspect of the present invention, another object identifier is provided for identifying a location of an object in a location system. The object identifier is attached to the object and radiates a signal including information on the location of the object. The object identifier includes a folded loop antenna formed to have at least a first loop plane and a second loop plane. The second loop plane of the folded loop antenna is formed by extending and folding the first loop plane of the folded loop antenna. The first and second loop planes are substantially perpendicular to the surface of the object where the object identifier is placed.

In accordance with another aspect of the present invention, a location system is provided for determining a location of an object. The location system includes an object identifier coupled to the object for transmitting a signal. The object identifier includes a horizontal circuit board formed on a first plane for the circuitry of the transmitter or object identifier, and a vertical loop antenna formed on a second plane. The location system also includes a location determining module for receiving the signal transmitted from the transmitter. The first plane is substantially perpendicular to the second plane of the vertical loop antenna.

In accordance with another aspect of the present invention, a location system is provided for determining a location of an object. The location system includes an object identifier coupled to the object for transmitting a signal. The location system also includes a location determining module for receiving the signal transmitted from the object identifier. The object identifier includes a folded loop antenna having at least a first loop plane and a second loop plane. The second loop plane of the folded loop antenna is formed by extending and folding the first loop plane of the folded loop antenna. The first and second loop planes are substantially perpendicular to the surface of the object where the object identifier is placed.

BREIF DESCRIPTION OF THE DRAWINGS

The aforementioned features and advantages, and other features and aspects of the present invention, will become better understood with regard to the following description and accompanying drawings, wherein.

Figure 9A:
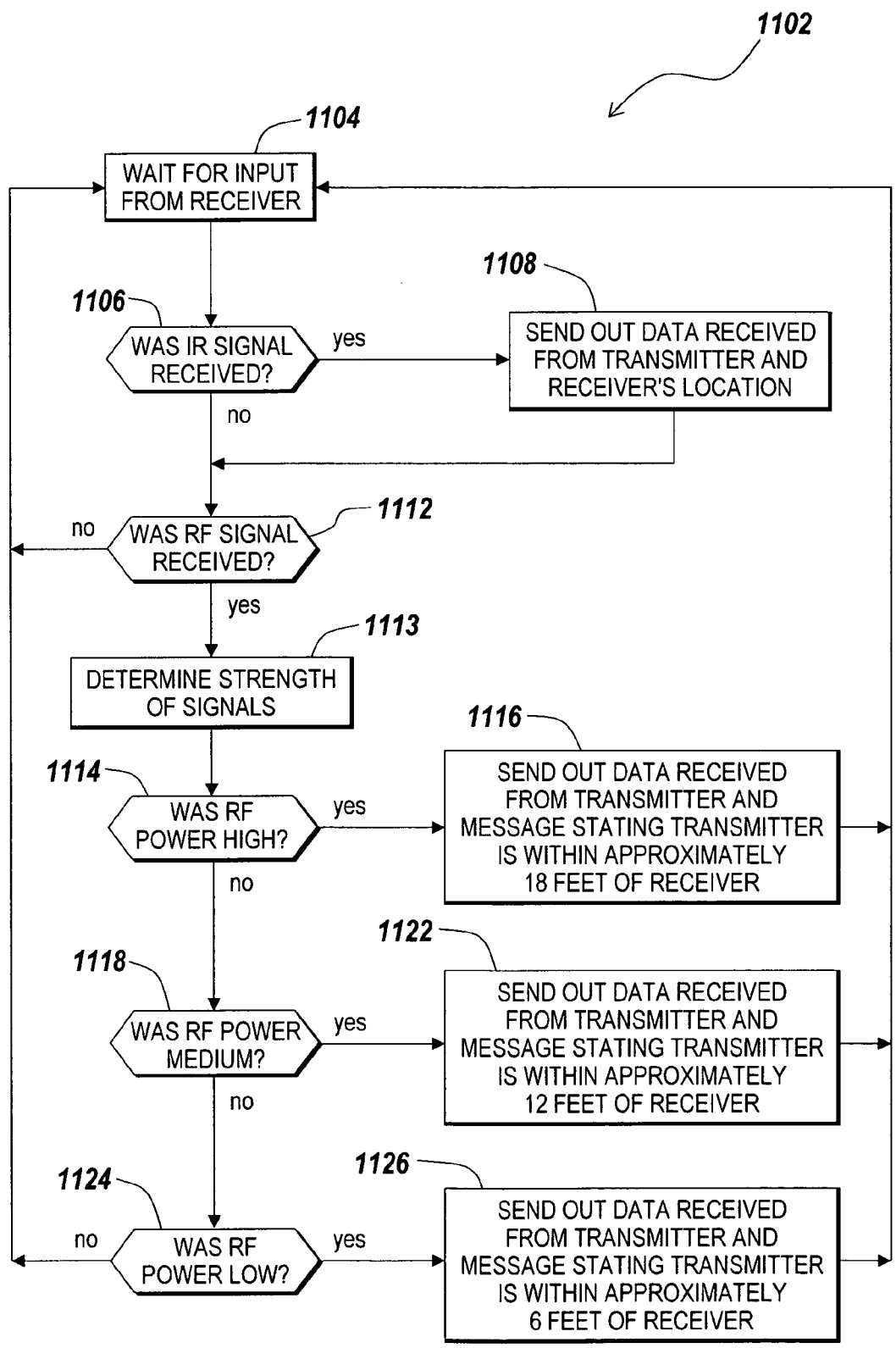
Figure 9B:
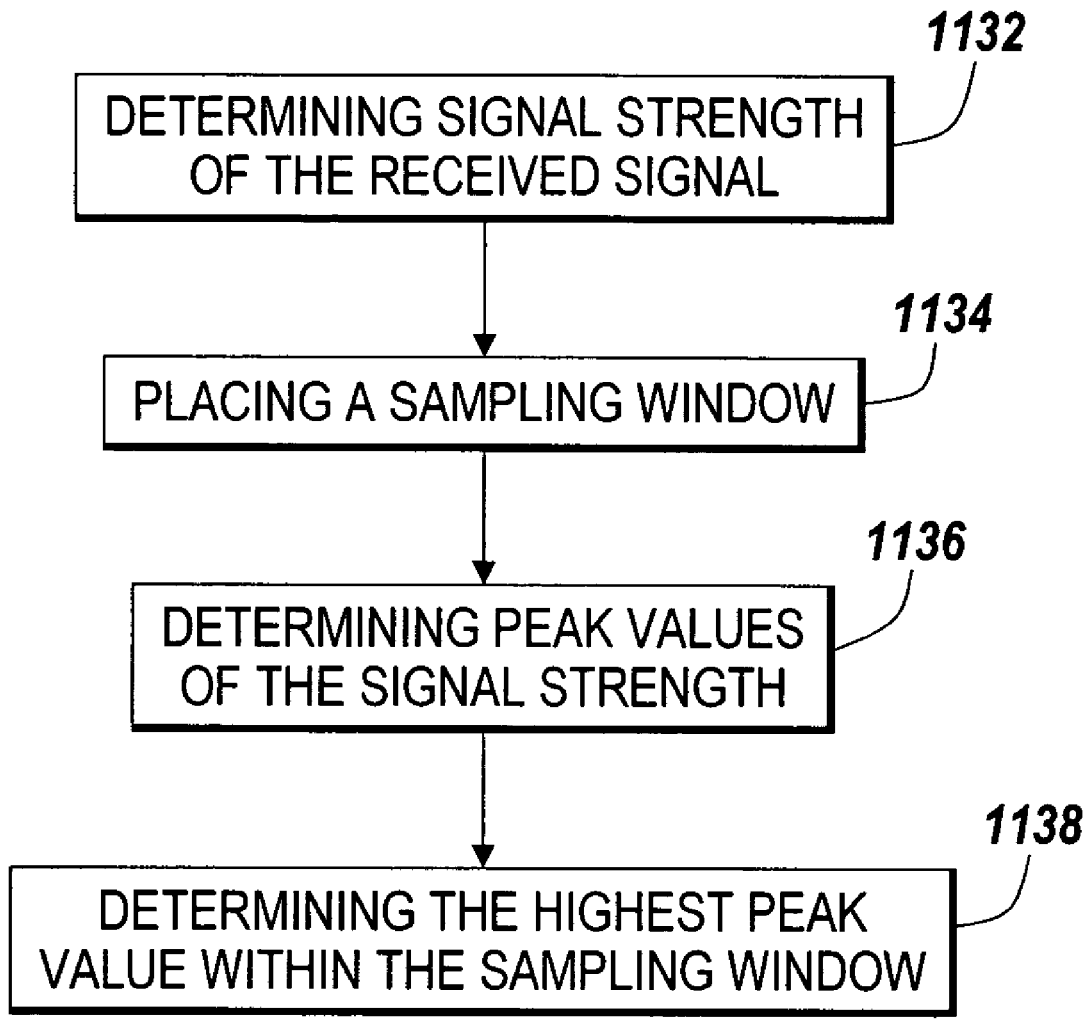
Figure 9C:
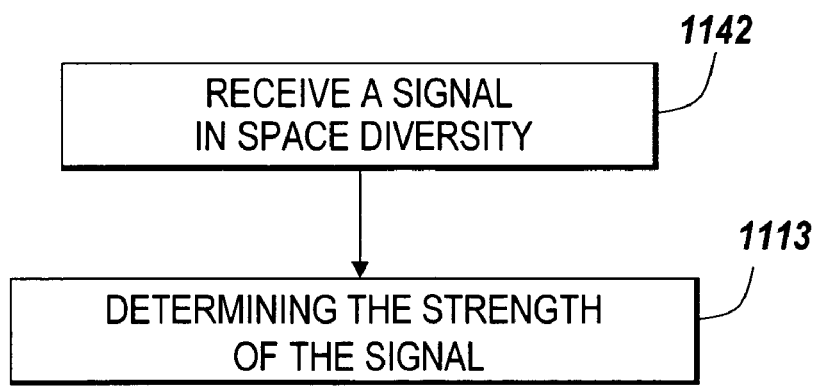
Figure 9D:
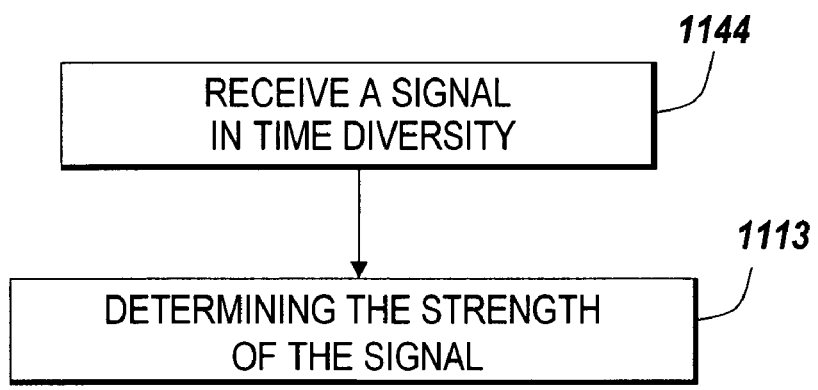
Figure 9E:
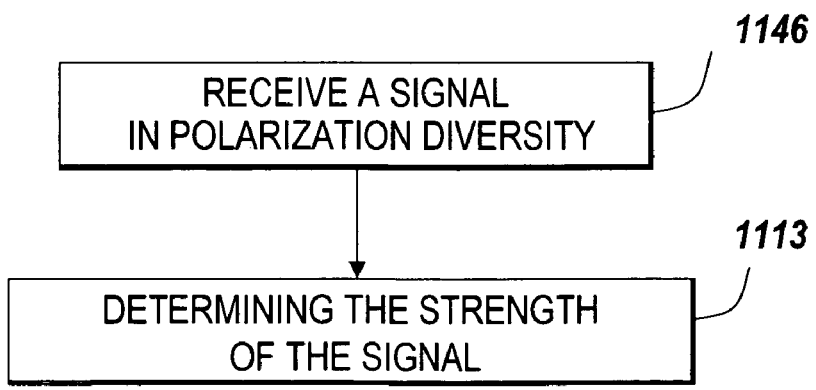
Figure 10A:
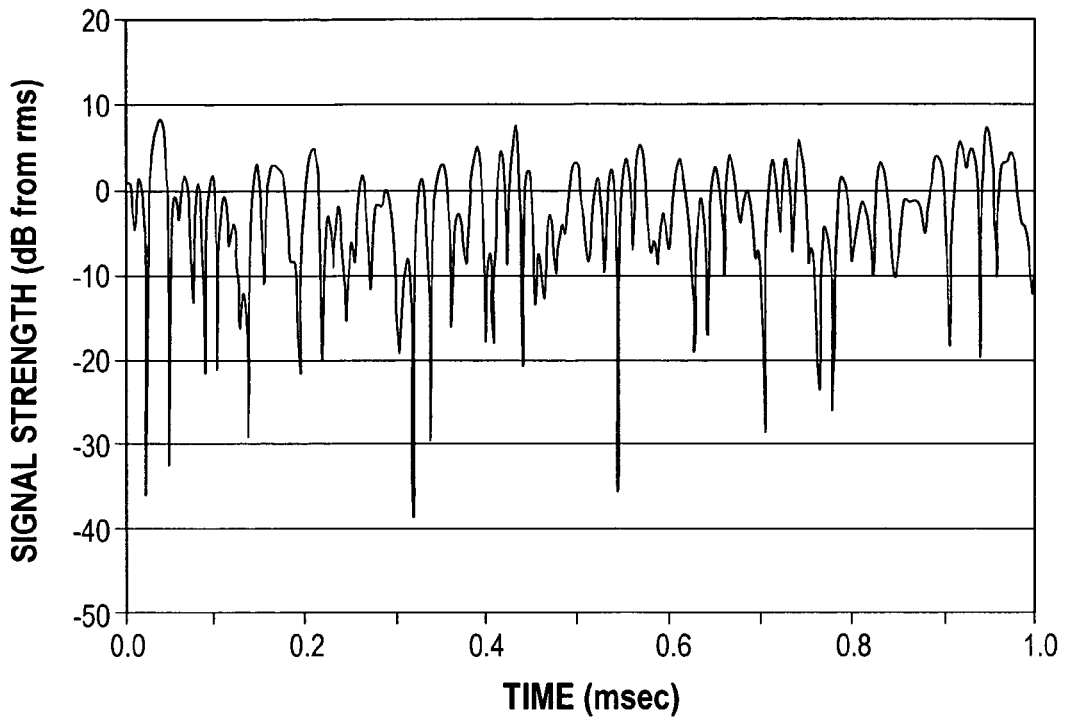
Figure 10B:
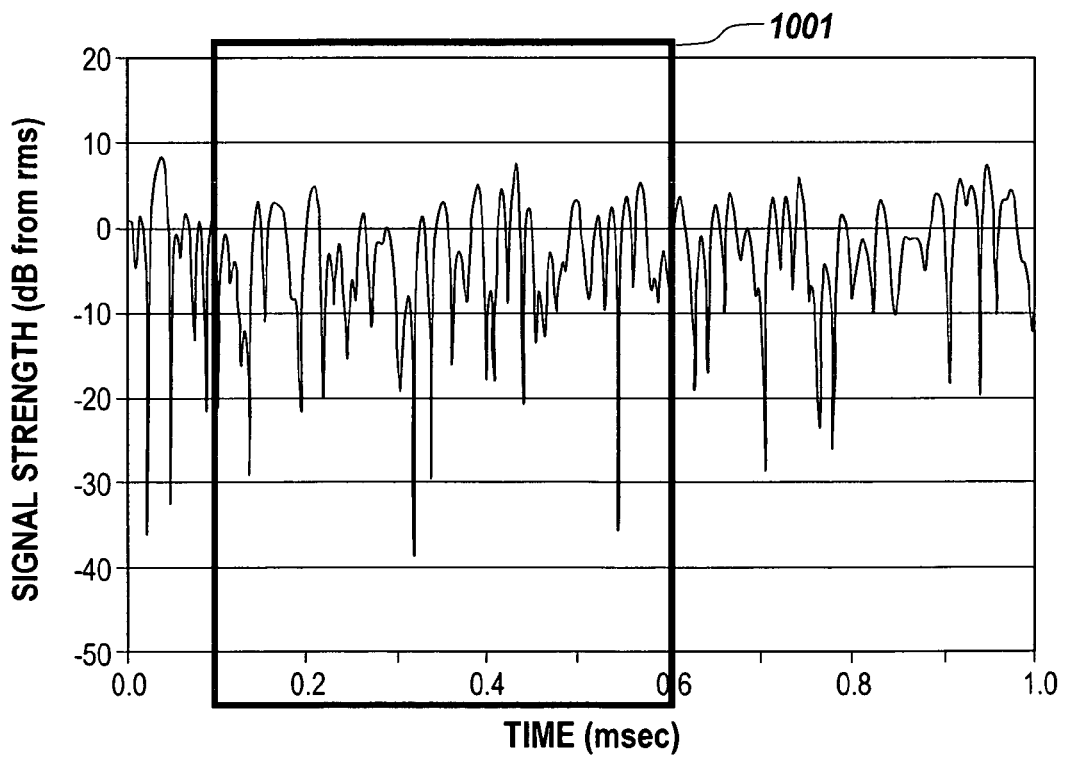
Figure 10C:
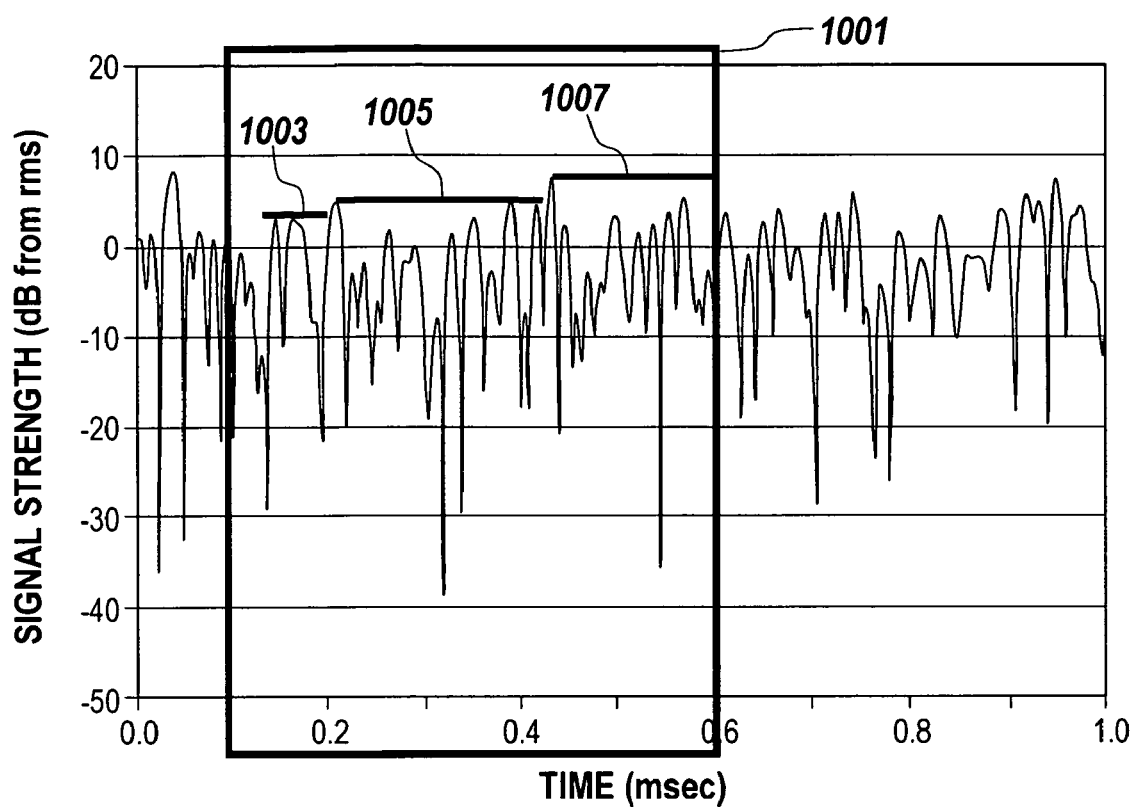
Figure 11:
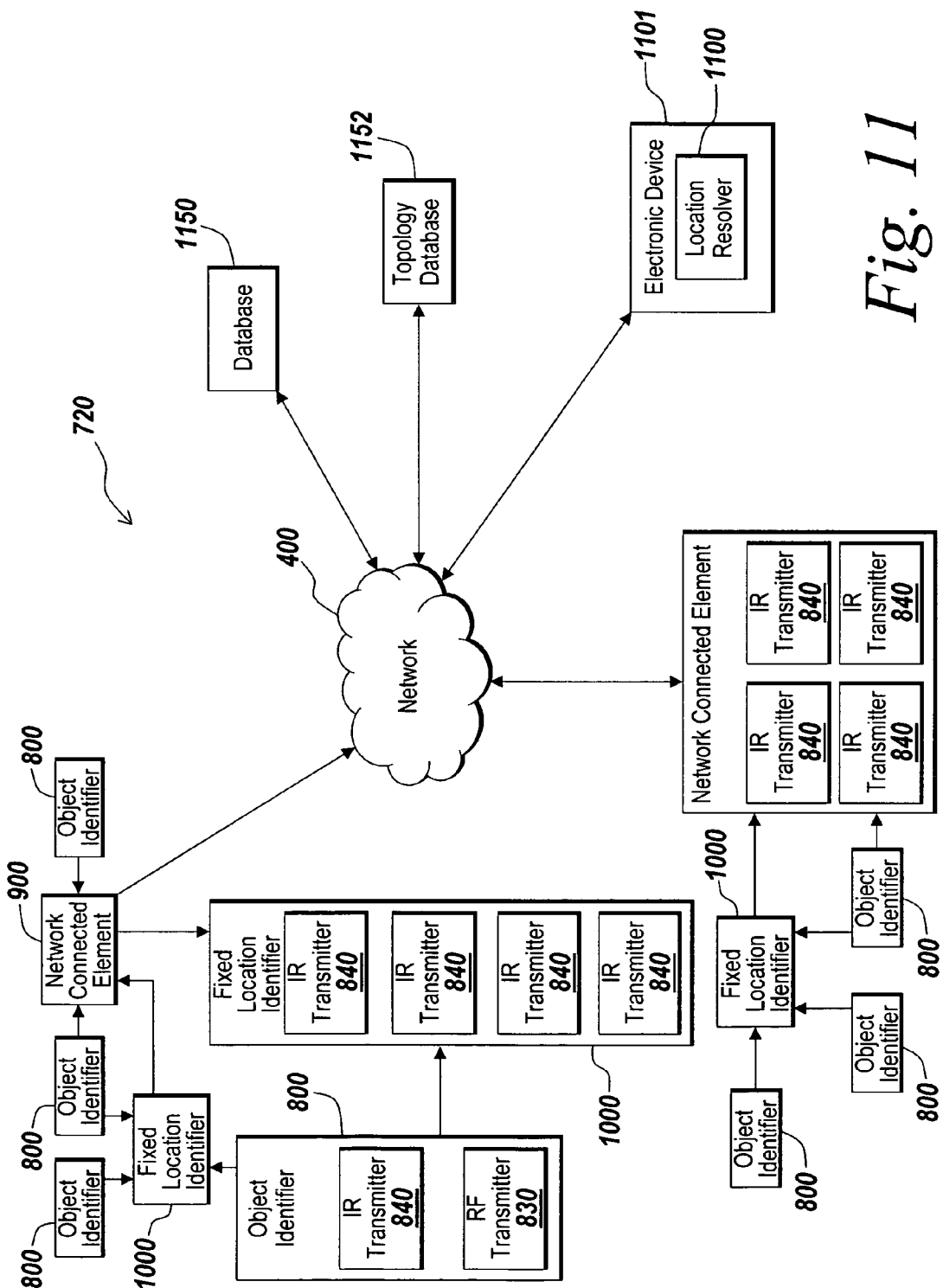
Figure 12:
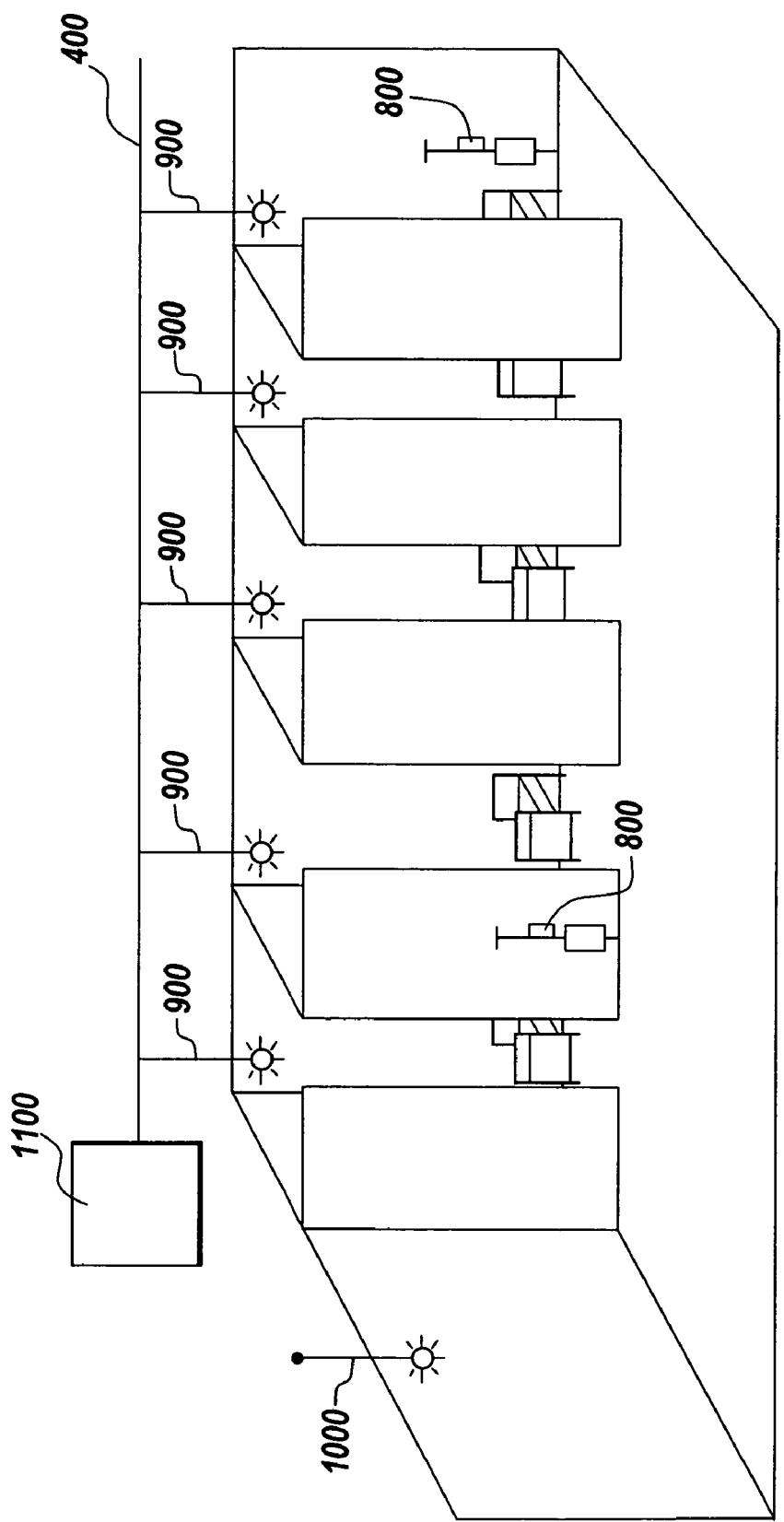
Figure 13:
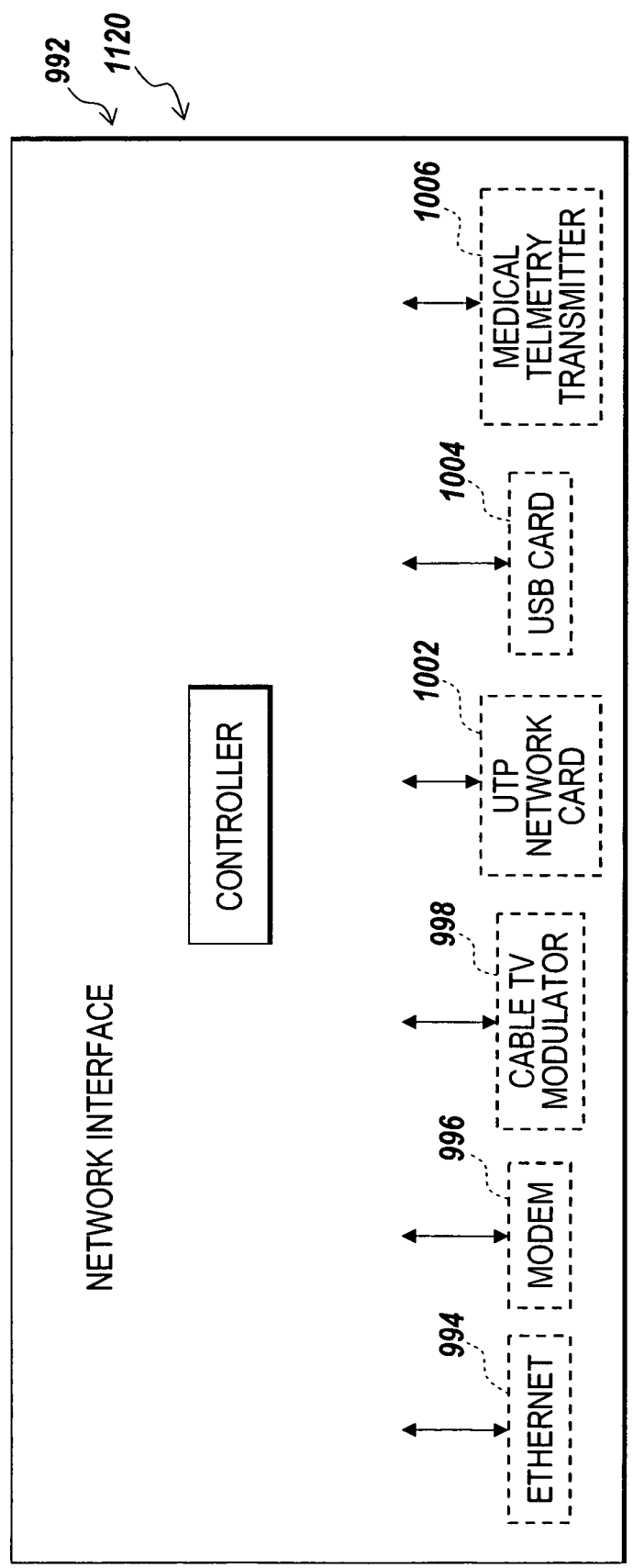

FIG. 9A provides a method of operation of a location resolver according to an embodiment of the invention;

FIG. 9B is flow chart showing an exemplary operation of the location resolver to determine the strength of the received signal according to an embodiment of the invention;

FIG. 9C is a flow chart illustrating that the peak picking method of the present invention is used in conjunction with space diversity;

FIG. 9D is a flow chart illustrating that the peak picking method of the present invention is used in conjunction with time diversity;

FIG. 9E is a flow chart illustrating that the peak picking method of the present invention is used in conjunction with polarization diversity;

FIG. 10A depicts an example of the received signal;

FIG. 10B depicts an example of the received signal with a sampling window superimposed on it;

FIG. 10C depicts an example of the received signal in which peak values are selected with the sampling window;

FIG. 11 illustrates a location system according to a further embodiment of the invention;

FIG. 12 provides a perspective view of a location system installed at a location according to a further embodiment of the invention; and FIG. 13 illustrates a network interface for use in a network connection element or a location resolver according to an embodiment of the invention.

DETAILED DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a location system that can be used to locate people or objects in a space, primarily indoors. In the illustrative embodiment, an array of sensors or receivers pick up energy transmitted from a device (tag), such as an object identifier and a transmitter, coupled to the people or objects. The examples of types of this energy may include infrared (IR), radio-frequency (RF) and ultrasonic (US). The location system processes the data obtained from the sensors and/or their supporting equipments using one or more computational techniques to determine the location of the people or objects. These computational techniques include, but are not limited to, triangulation, multilateration, received signal strength and time-of-arrival calculations, which will be described below in more detail with reference to FIG. 9A.

The illustrative embodiment provides a transmitter or object identifier that is able to radiate signals with consistent power regardless of the object where the transmitter or object identifier is placed. In the illustrative embodiment, the transmitter or object identifier may include a horizontal circuit board for the circuitry of the transmitter or object identifier. The horizontal circuit board is substantially parallel to the surface of the object where the transmitter or object identifier is placed. The transmitter or object identifier may also include a vertical loop antenna. The loop plane of the vertical loop antenna is substantially perpendicular to the surface of the object where the transmitter or object identifier is placed.

In another embodiment, the vertical loop antenna may be extended and folded to have additional loop planes. In still another embodiment, the additional loop planes may also be extended and folded to have further additional loop planes. The antennas of the illustrative embodiment of the present invention enable the transmitter or object identifier to radiate signals with consistent power regardless of the object where the transmitter or object identifier is placed and regardless of the orientation of the transmitter or object identifier.

Figure 1:
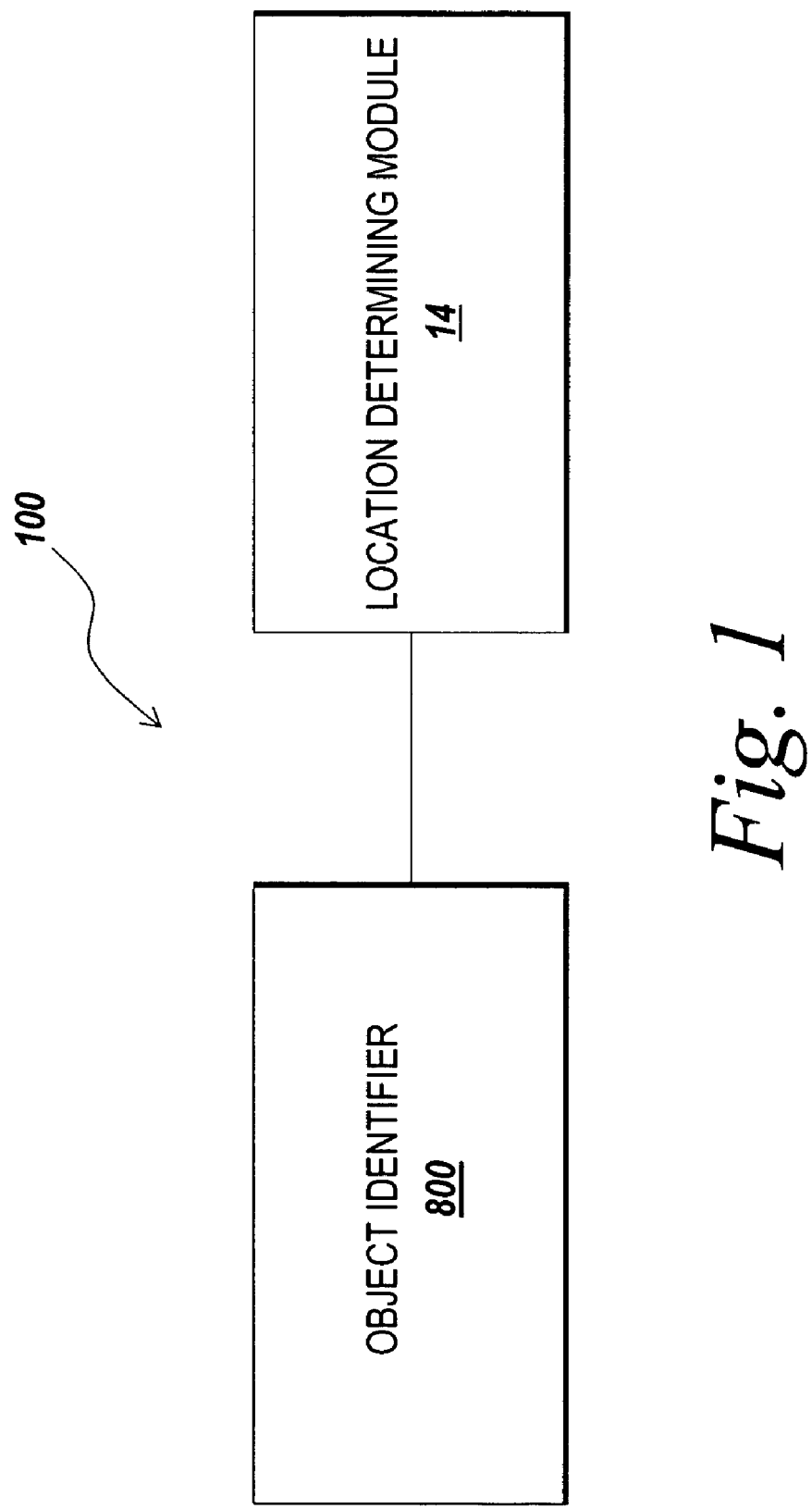
FIG. 1 illustrates an exemplary location system having an object identifier and a location determining module according to an embodiment of the invention.

FIG. 1 is an exemplary location system 100 provided in the illustrative embodiment of the present invention. The exemplary location system 100 includes an object identifier 800 and a location determining module 14. The object identifier 800 may be coupled to an object such that a location of the object corresponds to the location of the object identifier 800. The object identifier 800 may be any device capable of transmitting a signal for use in identifying a location of an object. In the illustrative embodiment of the present invention, the object identifier 800 can be implemented in an electronic device. The electronic device may take many forms of, for example, a portable computer, a personal digital assistant, a communication device, such as a cellular phone, a receiver, a transmitter, an interface or any combination of these devices.

According to various embodiments of the invention, the object identifier 800 transmits two identifiers, one identifier corresponding to the particular object identifier 800 and a second identifier which is a group designator. While the identifiers may be in many forms, some examples, according to various embodiments of the invention, include numbers, letters, URLs, MAC addresses and IP addresses. The object identifier 800 will be described below in more detail with reference to FIGS. 3A-5C.

According to an embodiment of the invention, the location determining module 14 may include any structure suitable for determining location. Examples include any device with intelligence to determine the location of one or more object identifiers. According to various embodiments of the invention, the location determining module 14 may include one or more, or combinations, of each of the following: a network connection element, a fixed location identifier, a location resolver, a database, topology data, an electronic device, a web interface, a network interface, a specialized network interface, an implementation interface, a database interface, a network and/or a specialized network, a receiver and/or a transmitter. According to various embodiments of the invention, the location determining module 14 may have only a receiver, only a transmitter, both a receiver and a transmitter, and additional hardware if desired. It will be apparent to one of ordinary skill in the art that one or more components may be distributed in a wide variety of configurations.

According to various embodiments of the present invention, the present invention may be used to determine a location of an object with the location determining module 14, or of the module 14 itself. In such an embodiment, the location determining module 14 may be a mobile module, capable of determining its own location relative to one or more object identifiers. In such an embodiment, the object identifiers may be fixed. Optionally, the object identifiers may be moving. One example of the use of a mobile location determining module 14 involves a location system configured to determine locations within a large area. If such a large area is populated by a small number of objects, the components of such a location system may be more efficiently configured by providing functionality of a location determining module 14 with each object. In such a case, object identifiers could be distributed throughout the large area. The location determining module 14 could then be adapted to receive location signals from the object identifiers and thereby determine a location of the location determining module 14. In this embodiment, the location of the objects is determined relative to the location of one or more object identifiers, although the locations of the object identifiers may be known, allowing locations of objects to be determined relative to other references or by name, such as a location on a map or a specific room.

The configuration above is contrasted with another embodiment of the invention, better suited to environments with a greater number of objects in a smaller area. In such an embodiment, each object may be provided with an object identifier. One or more location determining modules may then be located within the area to receive location signals transmitted by the object identifiers. In this embodiment, the location of the objects is determined by determining the location of the object identifiers.

According to various embodiments of the invention, the location determining module 14 may be capable of performing additional functionality, such as receiving requests for information, providing information, storing information, commanding actions in response to location information, associating objects with other objects or with locations, establishing privacy conditions regarding availability of location information, interfacing directly with various network types, and the like. According to further embodiments of the invention, the location determining module 14 includes multiple, distributed receivers, some of which may be connected to a network, and others not connected to a network. According to various embodiments of the invention, the object identifier 800 and location determining module 14 utilize both RF signals and IR signals for the determination of location.

According to an embodiment of the invention, the location determining module 14 may include one or more databases. The databases may store information relating to current location of object identifiers, fixed location identifiers and network connection elements. The databases will be described below in more detail with reference to FIG. 7.

According to various embodiments of the invention, the location system 100 may be employed within an enclosed structure and hence can be applied to as an indoor positioning system. Enclosed structures include buildings, such as office buildings, exhibition halls, health care institutions, homes or other structures. According to other embodiments, the invention may be used outside of enclosed structures or may be used both concurrently within and outside enclosed structures.

Figure 2:
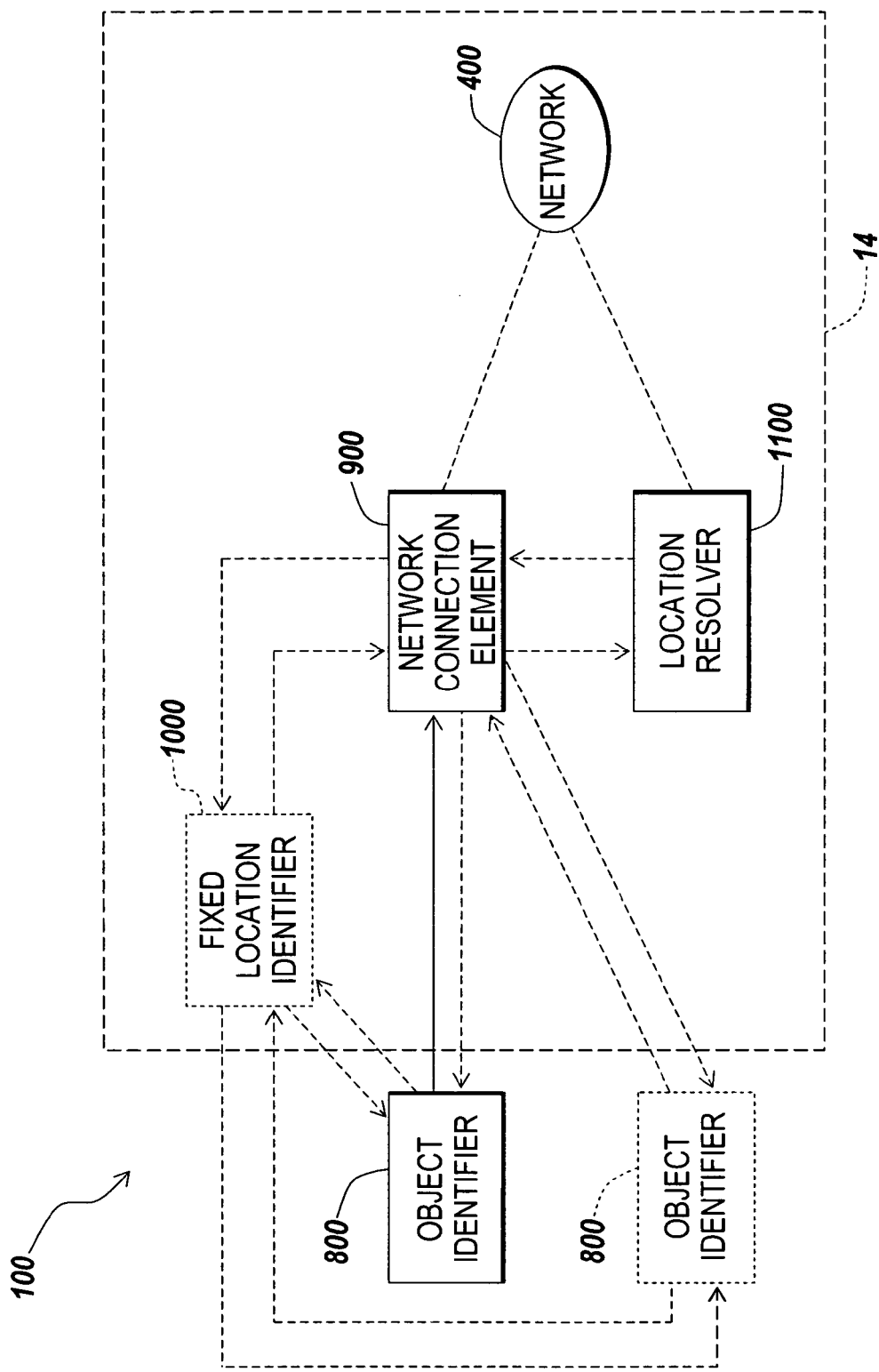
FIG. 2 illustrates the location system in more detail that includes a network connection element, one or more object identifiers, a location resolver, and an optional fixed location identifier.

FIG. 2 is a detailed block diagram of the location system 100 according to an illustrative embodiment of the present invention. The location system 100 is illustrated by way of example having an object identifier 800 in communication with a location determining module that include at least a network connection element 900. According to an embodiment of the invention, the object identifier 800 is physically coupled to an object so that the location of the object identifier 800 is considered to be the location of the object. According to another embodiment of the invention, the location of the object may be determined by locating one or more object identifiers 800 in an area and coupling a network connection element 900 to an object. In such an embodiment, the location of the network connection element 900, and hence the object, is determined relative to the one or more object identifiers 800. The network connection element 900 is configured to be coupled to a network 400. The network 400 may be a local area network (LAN), a wide area network (WAN), the Internet, an intranet, or a metropolitan network. The network may be a wireless network such as a Bluetooth network, a cellular network, a GSM based network, a hard wired network, or some other type of network. According to an optional embodiment of the invention, the network may be a wireless network. As illustrated in FIG. 2, one or more object identifiers 800 communicate to the network connection element 900. According to another embodiment of the invention, the network connection element 900 may communicate back to the object identifier 800.

According to a further embodiment of the invention, the location determining module 14 can include a fixed location identifier 1000. Those of ordinary skill in the art will recognize that the fixed location identifier 1000 can be separate from the module 14. The fixed location identifier 1000 is configured to receive signals from one or more object identifiers 800 and to retransmit that information. The retransmitted information may be received by the network connection element 900. According to one embodiment of the invention the retransmitted information includes the information provided by the object identifier 800, coupled with additional information to identify the fixed location identifier 1000 that is retransmitting the information. According to an embodiment of the invention, a plurality of network connection elements 900, fixed location identifiers 1000 and object identifiers 800 may be provided in the location system 100. In such a case, the network 400 may provide communication among the network connection elements 900 in order to determine the location of one or more object identifiers 800 by one or more network connection elements 900 or by the use of other devices coupled to the network 400.

As shown by way of example, a location determining module 14, according to an embodiment of the invention, is illustrated, by way of example, as including the network connection element 900, the fixed location identifier 1000 and the network 400. One or ordinary skill in the art will appreciate that the location determining module 14 may not include one or more of these elements in other embodiments.

According to an embodiment of the invention, the object identifier 800 and/or fixed location identifier 1000 transmits various information. According to an embodiment of the invention, this information is transmitted over both RF and IR signals. Optionally, the information may be transmitted over only one signal. According to an embodiment of the invention, examples of the information transmitted may include one or all of the following: RF power level; IR power level; battery level; input device status; transmission frequency, e.g. repetition rate, for any or all types of transmissions, such as IR and/or RF; an identifier corresponding to the transmitting device; an identifier corresponding to a group to which the transmitting device is associated; any information received from another system component; status or condition information; or the like. According to an embodiment of the invention, some information may be repeated over multiple signal transmissions. Examples include transmitting input device status over ten transmissions to increase the likelihood of receipt by other components of the location system.

According to another embodiment of the present invention, the location system 100 can include a location resolver 1100 provided for communication with the network connection element 900. In this embodiment, the location resolver 1100 communicates with one or more network connection elements 900, or if desired other system components, to obtain information pertaining to the location of one or more object identifiers 800 and one or more optional fixed location identifiers 1000. The location resolver 1100 may be provided in the form of software or hardware or a combination of both. The location resolver 1100 may communicate with one or more network connection elements 900 over a network 400. The location resolver 1100 may directly be coupled to one or more network connection elements 900 in other embodiments.

As shown by way of example, the location determining module 14, according to an embodiment of the invention, is illustrated, by way of example, as including the network connection element 900, the location resolver 1100 and the fixed location identifier 1000. In this embodiment, the network 400 is included in the location determining module 14, although this need not be the case, and the location resolver 1100 may communicate with the location determining module 14 directly or over the network 400. The location resolver 1100 will be described below in more detail with reference to FIGS. 8-10C.

Figure 3A:
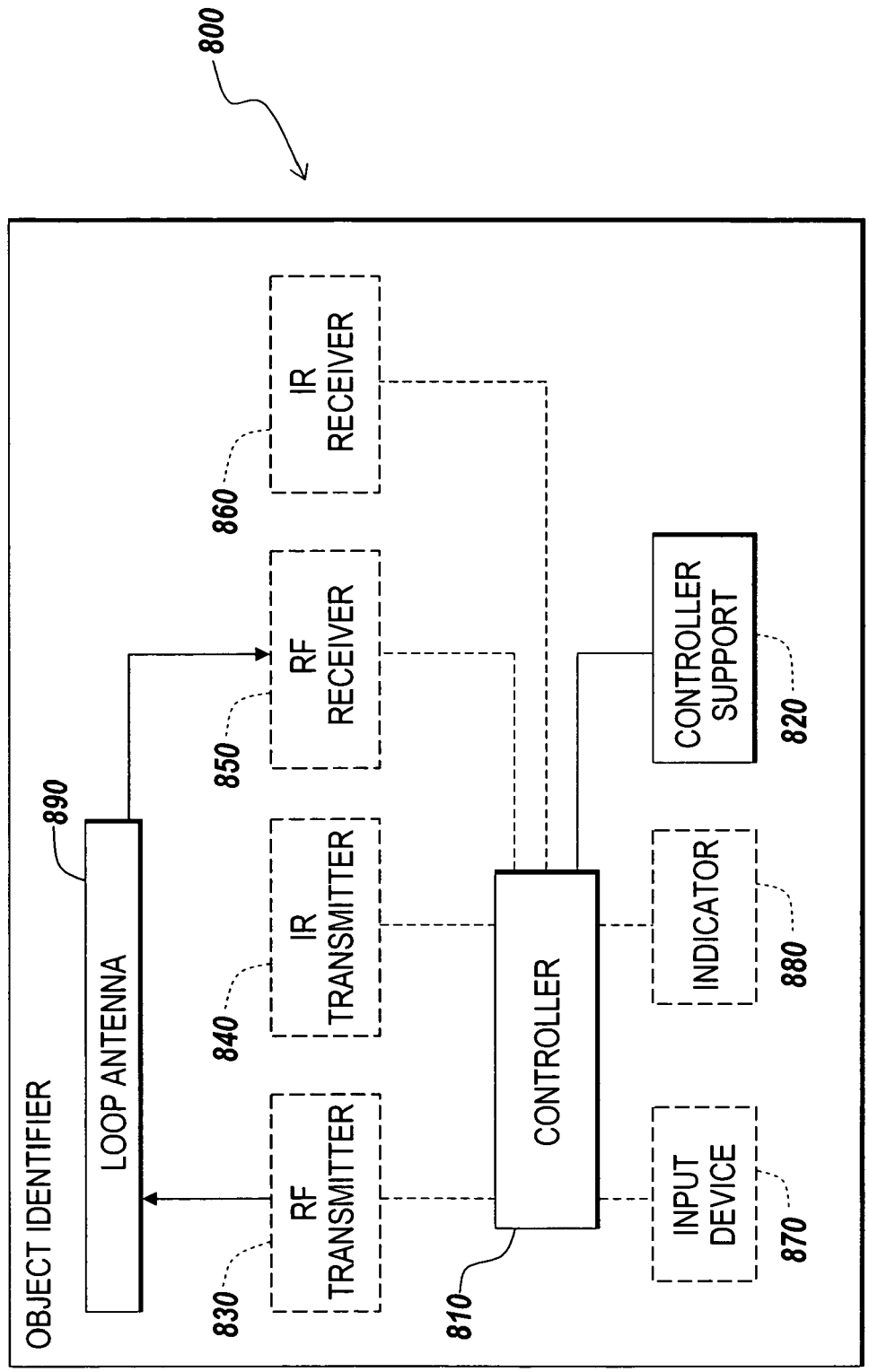
FIG. 3A illustrates an object identifier according to an embodiment of the invention.

FIG. 3A is an exemplary object identifier 800 used in the illustrative embodiment of the present invention. The object identifier 800 is provided with a controller 810 and controller support 820. The controller support 820 may include various items such as a power supply, such as a battery or other apparatus to provide electrical power, memory and/or various time keeping circuitry such as an oscillator. Controller support 820 may optionally include non-volatile memory. Various components of the controller support 820 may optionally be incorporated into the controller 810 or may be provided from an external source, outside the object identifier 800.

According to an embodiment of the invention, the object identifier 800 may be provided with an RF transmitter 830 and/or an IR transmitter 840 for transmitting RF and/or IR signals from the object identifier 800. According to another embodiment of the invention, the object identifier 800 may also be provided with an RF receiver 850 and/or an IR receiver 860 for receiving RF and/or IR signals in the object identifier 800. The RF transmitter 830 and/or the RF receiver 850 may be coupled to a loop antenna 890 for radiating or receiving the RF signals. The loop antenna 890 will be described below in more detail with reference to FIGS. 4A-4I.

The object identifier 800 may also be provided with an input device 870. Examples of input devices include buttons, switches, keypads, ports for electrical or optical communication with other devices, sensors, such as photocell cameras or microphones. Other types of input devices 870 may be apparent to one of ordinary skill in the art upon reading this disclosure and are to be considered within the scope of the invention. One or more input devices 870 are configured to provide input to the controller 810 in order to allow the controller 810 to take an action, not take an action, or to forward information outside the object identifier 800 by way of an RF transmitter 830 and/or an IR transmitter 840.

According to a further embodiment of the invention an indicator 880 may be provided to enable the controller 810 to output information in the proximity of the object identifier 800. Examples of indicators 880 include visual, audio and vibrational devices. Examples of these include buzzers, bells, horns, LEDs, other forms of lights and/or displays. The indicator 880 may be configured to display or output information determined by the controller 810 or received by the controller 810 through the input device 870, RF receiver 850 and/or the IR receiver 860.

Figure 3B:
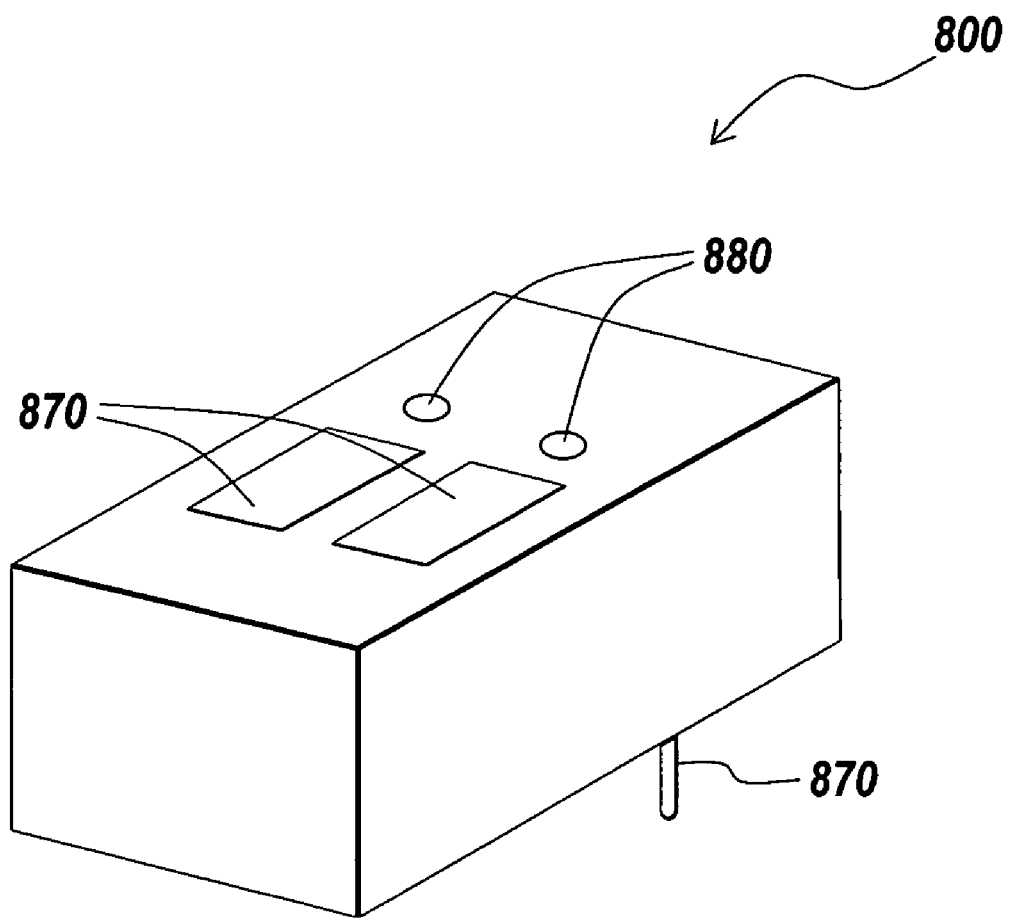
FIG. 3B is a perspective view of an object identifier according to an embodiment of the invention.

An object identifier 800 is illustrated by way of example according to an embodiment of the invention, in FIG. 3B. The object identifier 800 is illustrated with two indicators 880 in the form of two LEDs. Three input devices 870 are also illustrated in the form of switches. Two switches are illustrated so as to correspond to the two indicators 880, while the third switch 870 is illustrated on an opposing surface of the object identifier 800. According to this illustrative embodiment, the input device 870 on the lower surface of the object identifier 800 is normally pushed in when the object identifier 800 is attached to an object. Upon removal from the object, the input device 870 extends, resulting in a change of position of the input device 870. This embodiment allows the controller 810 to be alerted when the object identifier 800 is removed from an object. Each of the indicators 880 may be configured to illuminate upon the activation of the corresponding switches, input devices 870, so as to allow visual confirmation of the activation of one of the switches. Various uses of these switches will become apparent to one of ordinary skill in the art. Several examples, by way of illustration, include panic alerts, causing the processor 810 to emit a specialized signal through at least one of the RF transmitter 830 and the IR transmitter 840. A further example may involve an ability to configure a portion of the location system 100 remotely by the activation of the input devices 870.

Figure 4A:
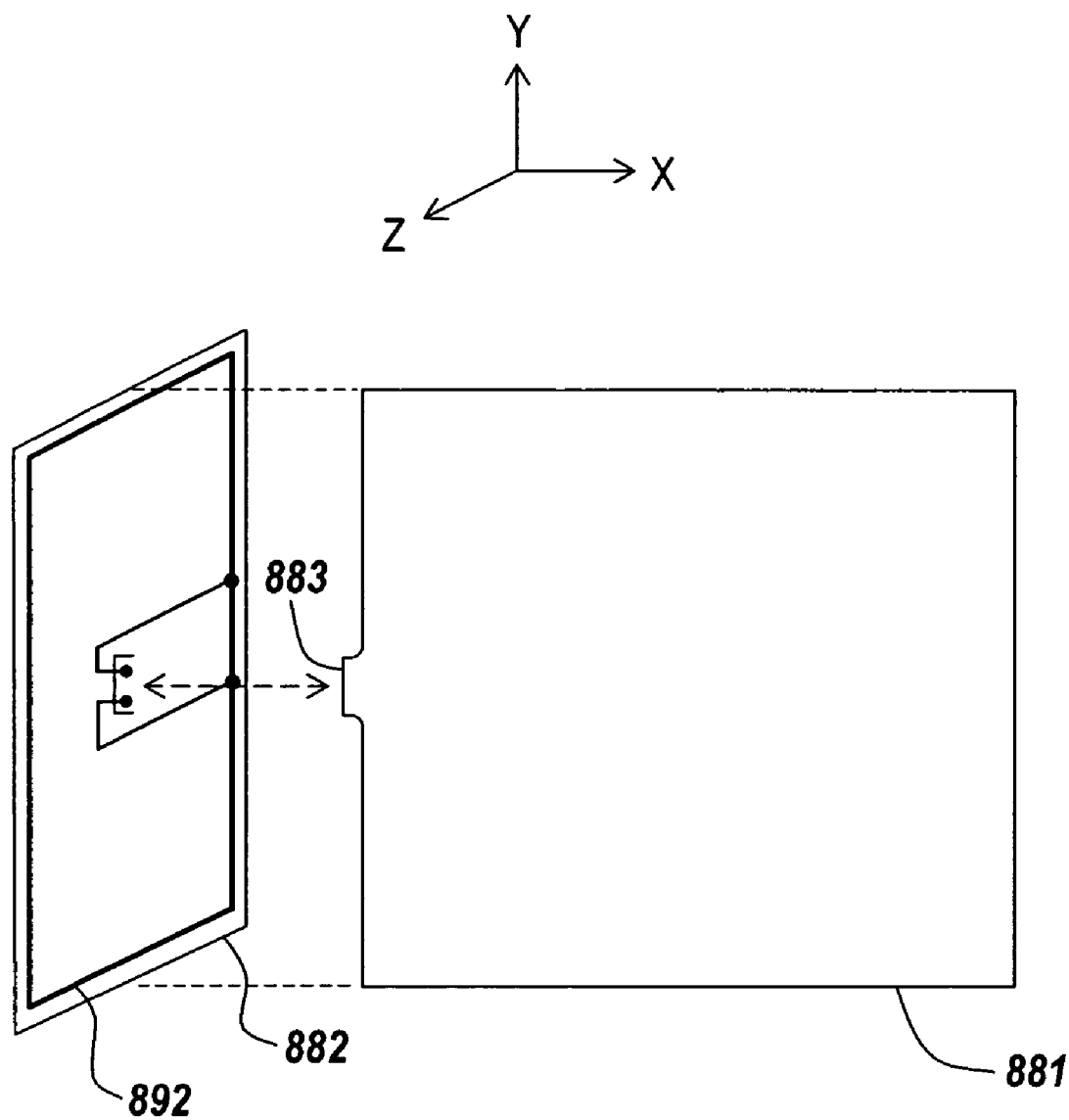
FIG. 4A depicts exemplary loop antennas utilized for the object identifier in the illustrative embodiment of the present invention.

FIG. 4A shows an exemplary implementation of the antenna 890 depicted in FIG. 3A. The object identifier 800 may include a horizontal circuit board 881 that are coupled to a vertical antenna board 882 via a connector 883. The horizontal circuit board 881 may include electrical or electronic components for the elements of the object identifier 800 described above with reference to FIGS. 3A and 3B. The horizontal circuit board 881 may be placed on the X-Y plane that is substantially parallel to the surface of an object on which the object identifier 800 is placed.

The vertical antenna board 882 may include a vertical loop antenna 892 in a portion of the vertical antenna board. In the illustrative embodiment, the vertical loop antenna 892 is placed in the peripheral edge portion of the vertical antenna board 882. In the illustrative embodiment, the vertical loop antenna 892 is shown as a box with square corners. Those of skill in the art will appreciate that this shape of the vertical loop antenna 892 is illustrative and not limiting the scope of the present invention. Rather, the vertical loop antenna 892 can be square or oblong circles or anything in between. The vertical loop antenna 892 is delta-tapped and connected to the horizontal circuit board 881 via the connector 883. Those of skill in the art will appreciate that the delta tap is illustrative and the vertical loop antenna 892 can be driven using different methods in other embodiments. The vertical loop antenna 892 can be formed using, for example, 18 gauge copper wire. The vertical loop antenna 892 can be a loop of wire or a foil on a circuit board or a combination of the two (e.g. a circuit board in one plane and wire hoops soldered to the board in another plane).

Figure 4B:
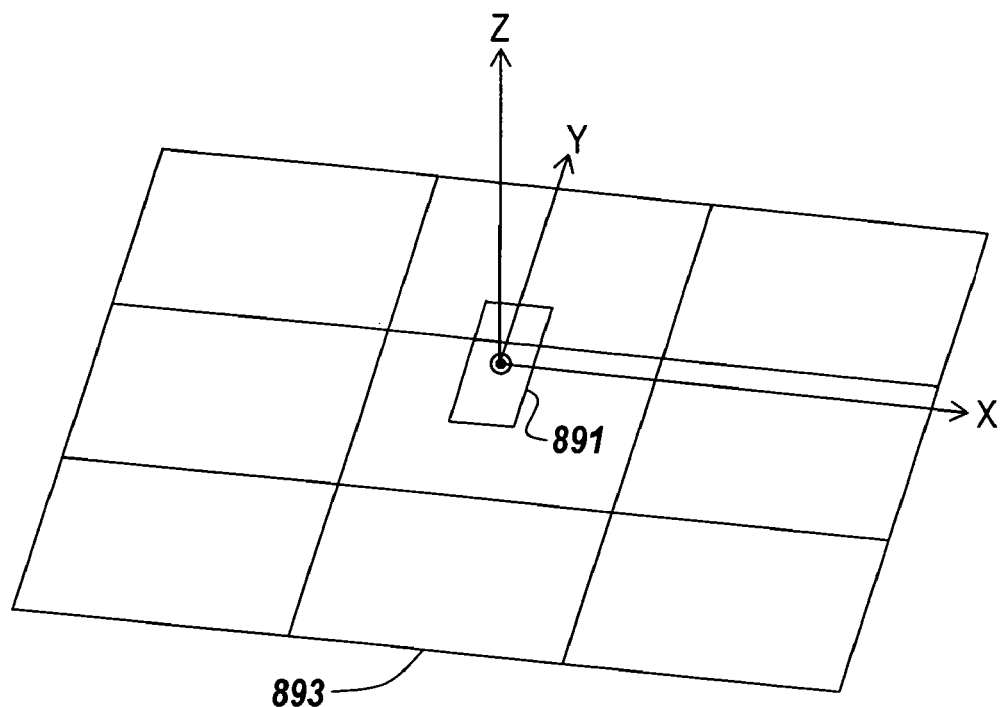
FIGS. 4B and 4C depict test environments where the horizontal and vertical loop antennas are placed over a ground grid, respectively.
Figure 4C:
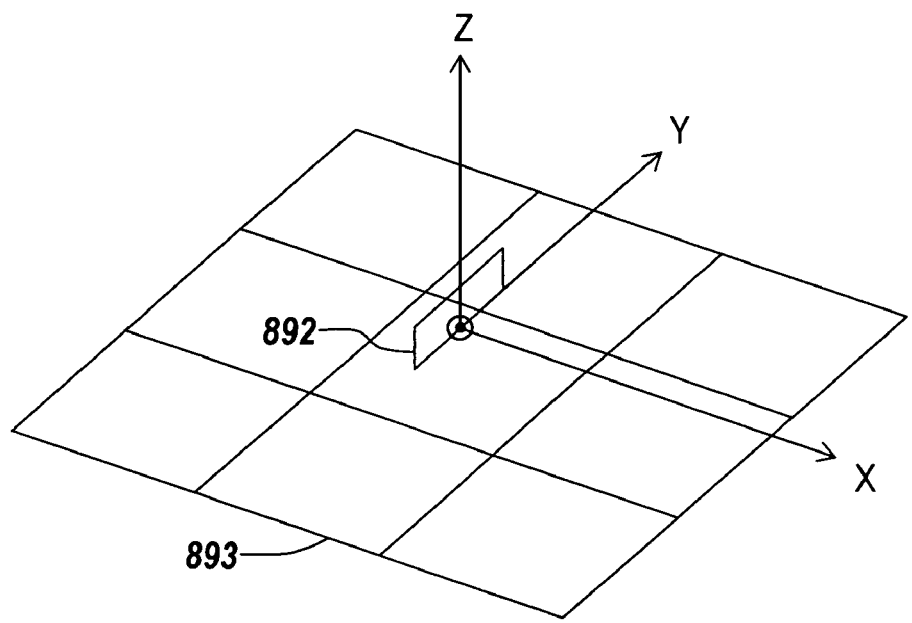

FIGS. 4B and 4C depict the test environments in which the radiation of signals from the horizontal loop antenna 891 and the vertical loop antenna 892 is tested. In FIG. 4B, the loop plane of the horizontal loop antenna 891 is placed on the X-Y plane, which is substantially parallel to the surface of the object on which the object identifier 800 is placed. A ground grid 893 is located below the loop plane of the horizontal loop antenna 891. The ground grid 893 represents mounting the object identifier 800 on a metallic surface. In FIG. 4C, the loop plane of the vertical loop antenna 892 is placed on the Y-Z plane, which is substantially perpendicular to the surface of the object on which the object identifier 800 is placed. The same ground grid 893 is also placed below the bottom of the vertical loop antenna 892.

In the illustrative embodiment of the present invention, the loop area of the vertical loop antenna 891 is assumed to be approximately the same as the loop area of the horizontal loop antenna 892. Those of skill in the art will appreciate that the loop areas of the vertical loop antenna 891 and the horizontal loop antenna 892 can be different in other embodiments depending on the design of the object identifier 800 and the characteristic of the signals transmitted from the object identifier 800.

Figure 4D:
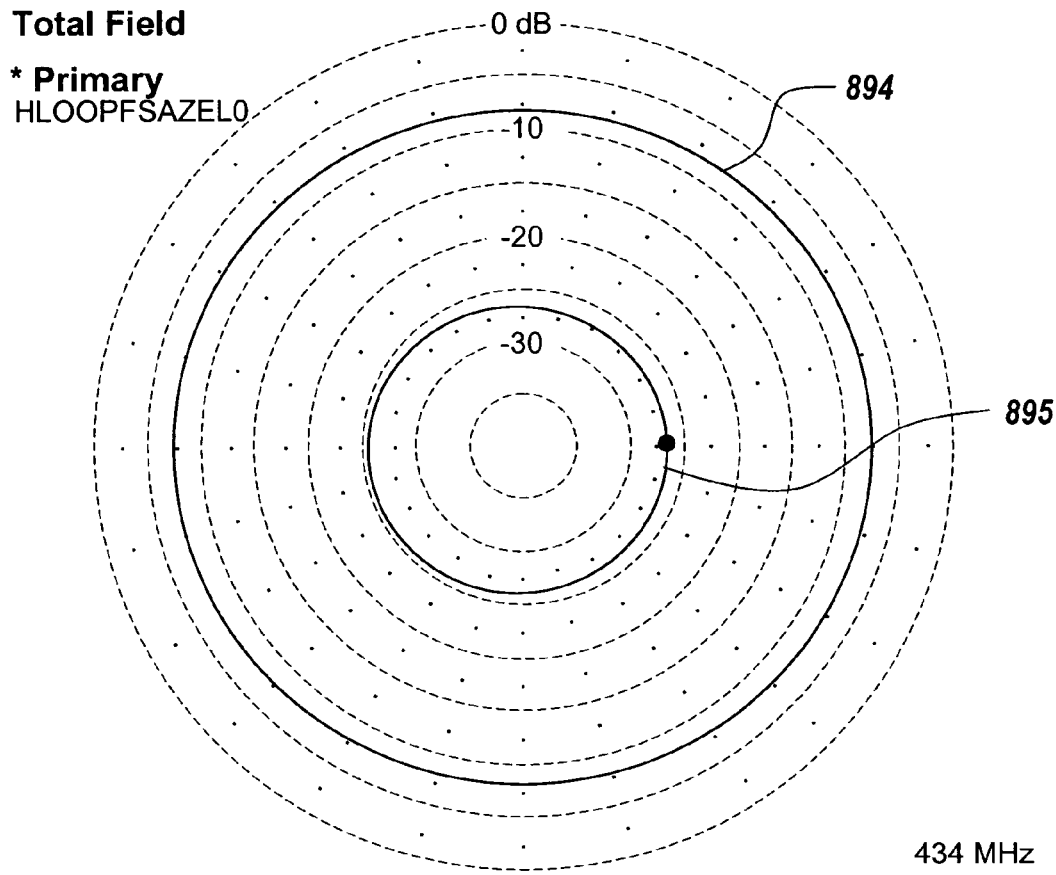
FIGS. 4D and 4E show the azimuthal radiation patterns of the horizontal and vertical antennas depicted in FIGS. 4B and 4C, respectively.
Figure 4E:
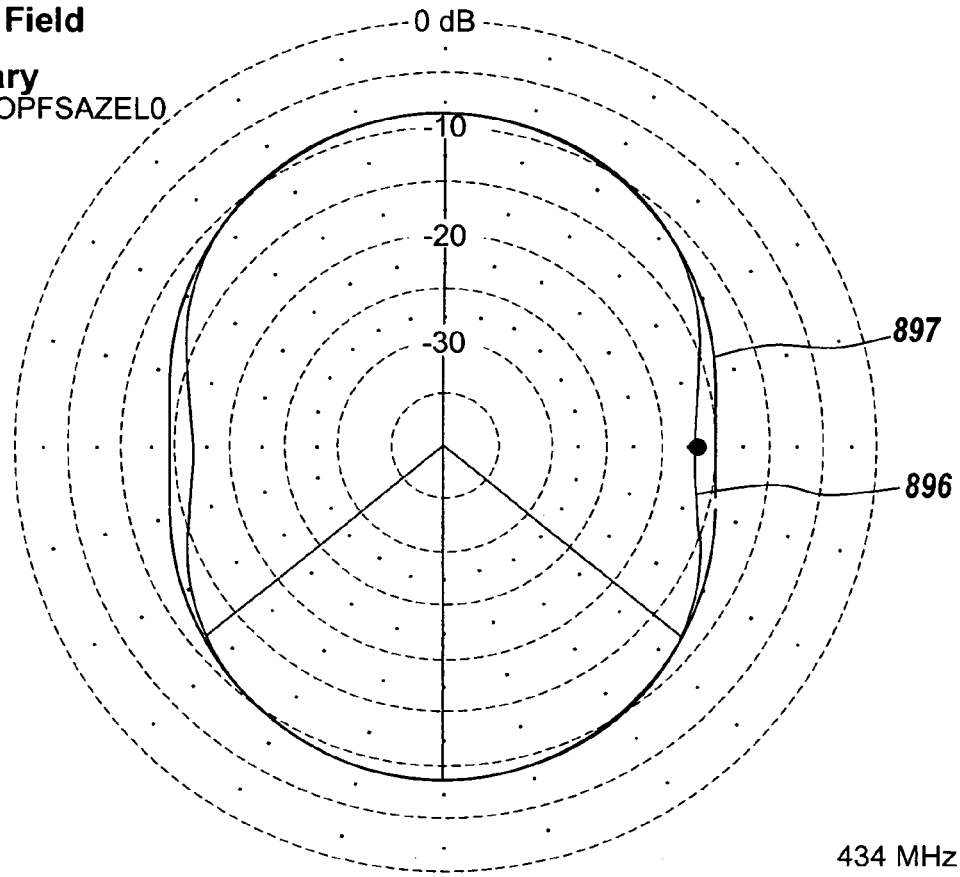

FIGS. 4D and 4E depict the results of the radiation tests of the horizontal loop antenna 891 and the vertical loop antenna 892 depicted in FIGS. 4B and 4C, respectively. FIGS. 4D and 4E show the azimuthal radiation patterns plotted with a reference level of 0 dB at the outer ring. The plots represent the horizontal pattern with the X axis running left to right and the Y axis running down to up. FIGS. 4D and 4E show the azimuthal radiation patterns of the horizontal and vertical loop antennas, respectively, operating at 433.99 MHz. Although the tests operate at 433.99 MHz in the illustrative embodiment, the vertical loop antenna of the present invention can operate across the spectrum of frequencies. Preferably, the vertical loop antenna of the present invention is useful in the UHF spectrum. The dimensions of the loop antenna described below with reference to FIG. 4F are based on a loop antenna operating at 434 MHz.

FIG. 4D shows the azimuthal radiation pattern 894 of the horizontal loop antenna 891 generated in free space without the horizontal ground grid 893. FIG. 4D also shows the azimuthal radiation pattern 895 of the horizontal loop antenna 891 generated with the horizontal ground grid 893, which represents that the object identifier 800 is mounted on a metallic surface. The azimuthal radiation pattern 895 traces differently than the azimuthal radiation pattern 894 generated in free space. The plots in FIG. 4D indicates that the azimuthal radiation patterns of the horizontal loop antenna 891 is affected by the horizontal ground grid 893.

FIG. 4E shows the azimuthal radiation patterns of the vertical loop antenna 892 depicted in FIG. 4C. FIG. 4E shows the azimuthal radiation pattern 896 of the vertical loop antenna 892 generated in free space without the horizontal ground grid 893. FIG. 4E also shows the azimuthal radiation pattern 897 of the vertical loop antenna 892 generated with the horizontal ground grid 893, which represents that the object identifier 800 is mounted on a metallic surface. The azimuthal radiation pattern 897 generated with the horizontal ground grid 893 traces the azimuthal radiation pattern 896 generated in the free space. The plots 896 and 897 indicate that the radiation pattern of the vertical loop antenna 892 is less affected by the horizontal ground grid 893 than the horizontal loop antenna 891.

Figure 4F:
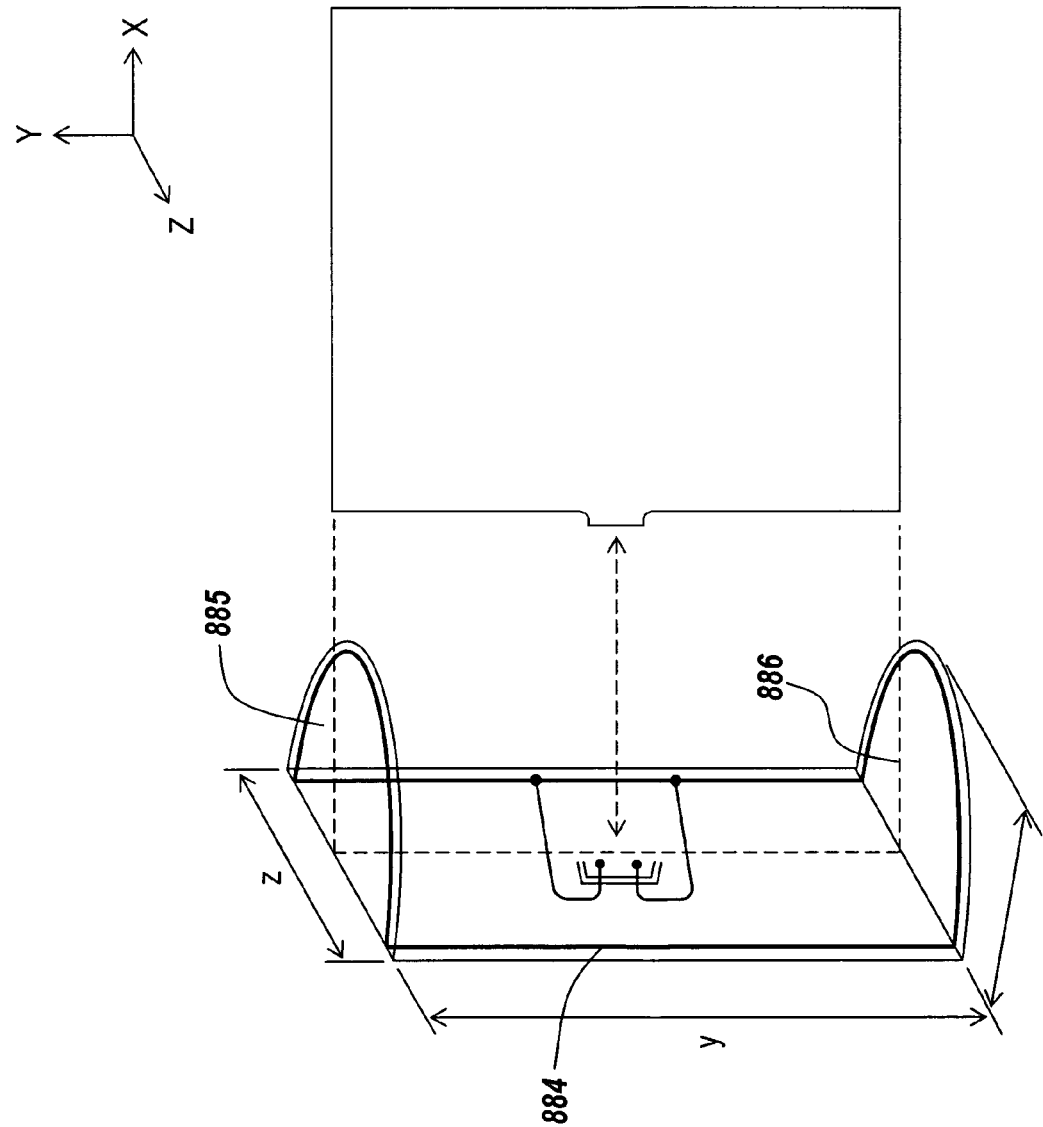
FIG. 4F depicts an exemplary folded vertical loop antenna utilized for the object identifier in the illustrative embodiment of the present invention.

FIG. 4F shows an exemplary folded vertical loop antenna 884 utilized in another illustrative embodiment of the present invention. In FIG. 4F, the Y-Z loop plane of the vertical loop antenna 884 is extended and folded to form additional Z-X loop planes 885 and 886. The folded loop antenna 884 can be formed by extending the Y-Z loop plane of the vertical loop antenna 884 and folding the extended loop plane to form additional Z-X loop planes 885 and 886. The area of the loop plane 885 of the folded loop antenna 884 may approximately be the same as the area of the loop plane 886 of the folded loop antenna 884 in the illustrative embodiment. Those of ordinary skill in the art will appreciate that the areas of the additional loop planes 885 and 886 may be different in other embodiments. In the illustrative embodiment, the dimensions of the Y-Z loop plane and the Z-X lop plane are 0.8 inch×0.4 inch and 0.4 inch×0.6 inch, respectively. Those of ordinary skill in the art will appreciate that the dimensions of the loop planes are illustrative and not limiting the scope of the present invention.

Figure 4G:
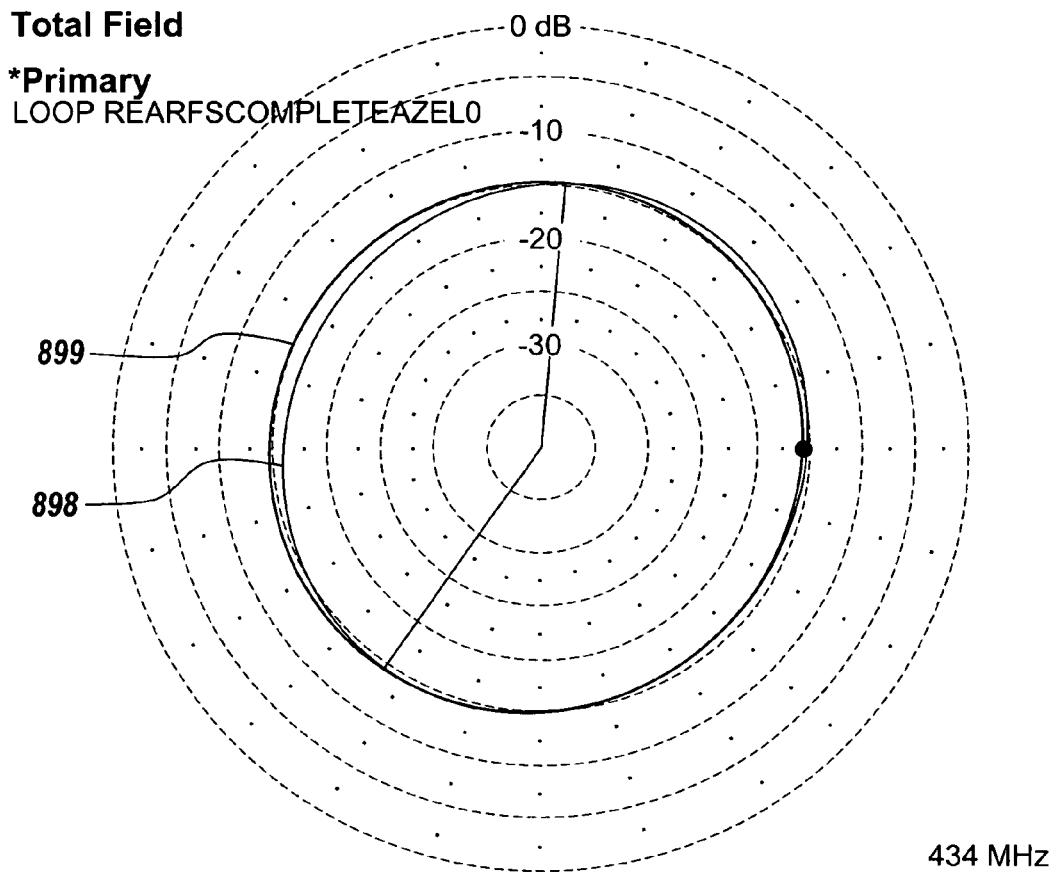
FIG. 4G shows the azimuthal radiation patterns of the folded vertical loop antenna depicted in FIG. 4F.

FIG. 4G shows the azimuthal radiation patterns of the folded loop antenna 884 depicted in FIG. 4F. FIG. 4G shows the azimuthal radiation pattern 898 of the folded loop antenna 884 generated in free space without the horizontal ground grid 893. FIG. 4G also shows the azimuthal radiation pattern 899 of the folded loop antenna 884 generated with the horizontal ground grid 893, which represents mounting the object identifier 800 on a piece of equipment having a metal surface. The azimuthal radiation pattern 899 generated with the ground grid 893 traces the azimuthal radiation pattern 898 generated in free space. The plots 898 and 899 show that the azimuthal radiation pattern of the folded loop antenna 884 is less affected by the horizontal ground grid 893 than the horizontal loop antenna 891. The plots 898 and 899 in FIG. 4G also shows that the azimuthal radiation patterns 898 and 899 of the folded loop antenna 884 are more consistent and isotropic than the azimuthal radiation patterns 896 and 897 of the vertical loop antenna 892. This means that the folded loop antenna 884 can reduce the nulls produced in the azimuth radiation patterns 896 and 897 depicted in FIG. 4E.

Figure 4H:
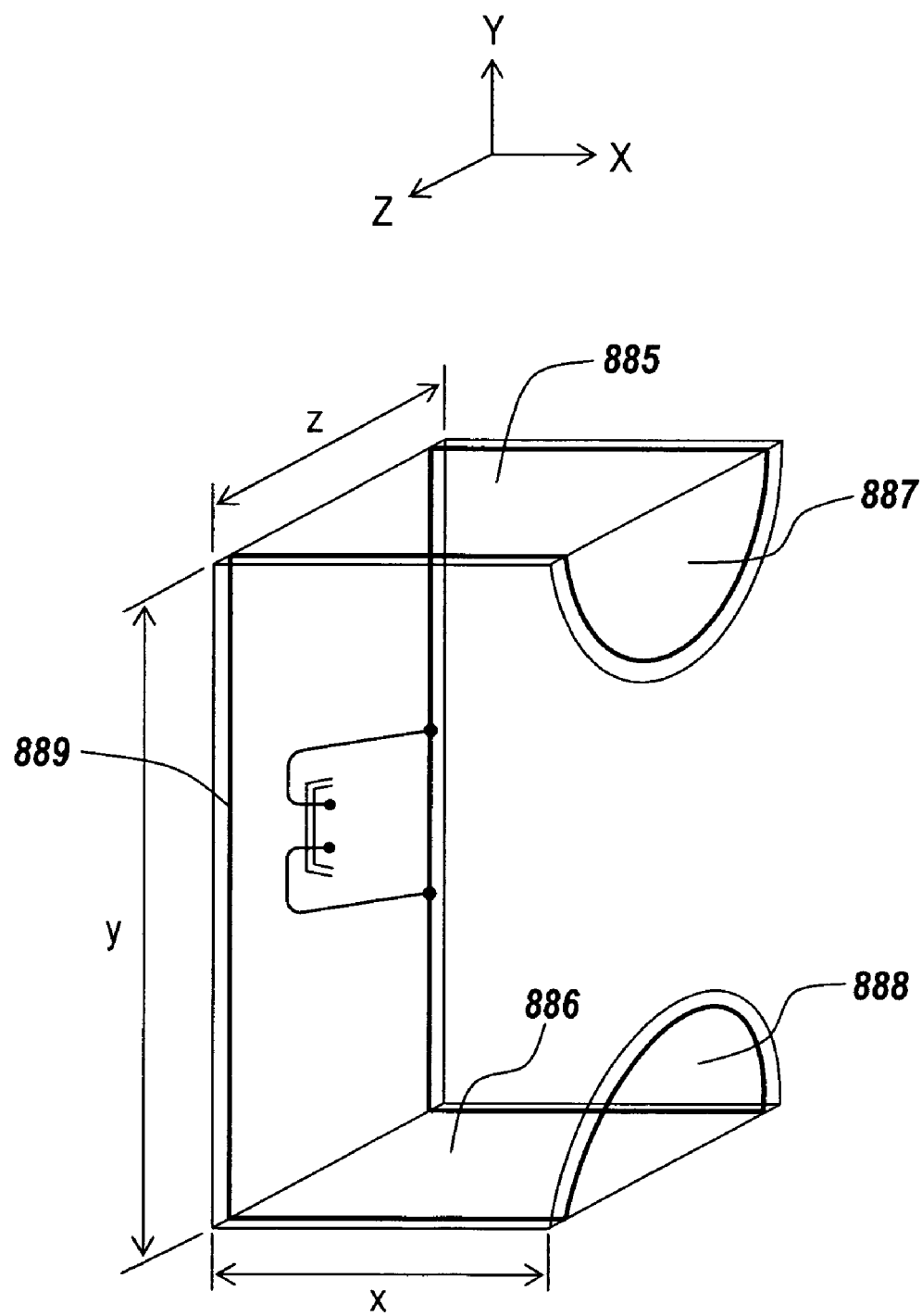
FIG. 4H depicts another exemplary folded vertical loop antenna utilized for the object identifier in the illustrative embodiment of the present invention.

FIG. 4H shows another folded vertical loop antenna 889 in another illustrative embodiment of the present invention. In FIG. 4H, the Z-X loop planes 885 and 886 of the vertical loop antenna 889 are extended and folded to include additional Y-Z loop planes 887 and 888. The folded loop antenna 889 can be formed by extending the Z-X loop planes 885 and 886 of the vertical loop antenna 889 and folding the extended loop planes to form the additional Y-Z loop planes 887 and 888. The area of the loop plane 887 of the folded loop antenna 889 may approximately be the same as the area of the loop plane 888 of the folded loop antenna 889 in the illustrative embodiment. One of ordinary skill in the art will appreciate that the areas of the further additional loop planes 887 and 888 may be different in other embodiments.

Figure 5A:
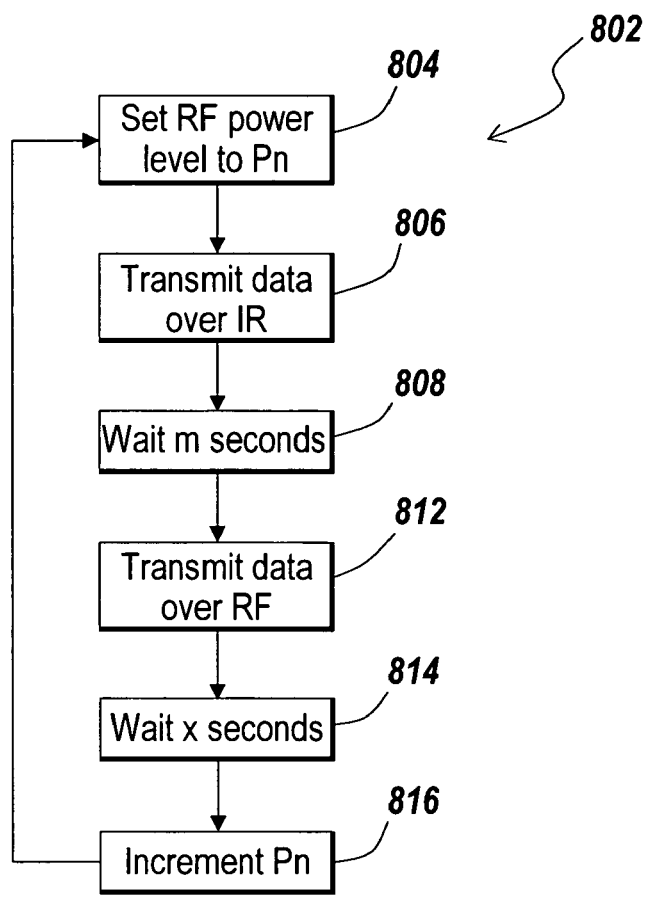
FIGS. 5A-5C illustrate various methods of operation of an object identifier according to various embodiments of the invention.
Figure 5B:
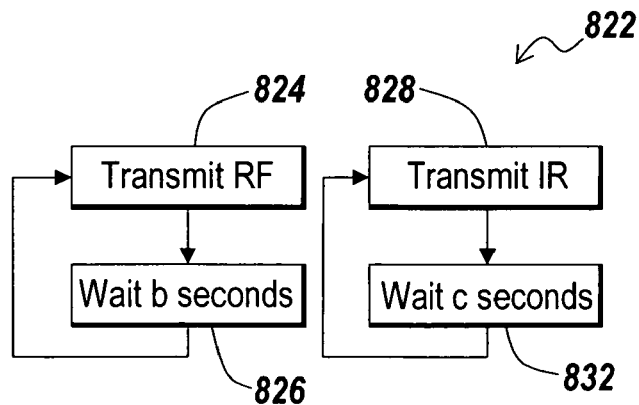
Figure 5C:
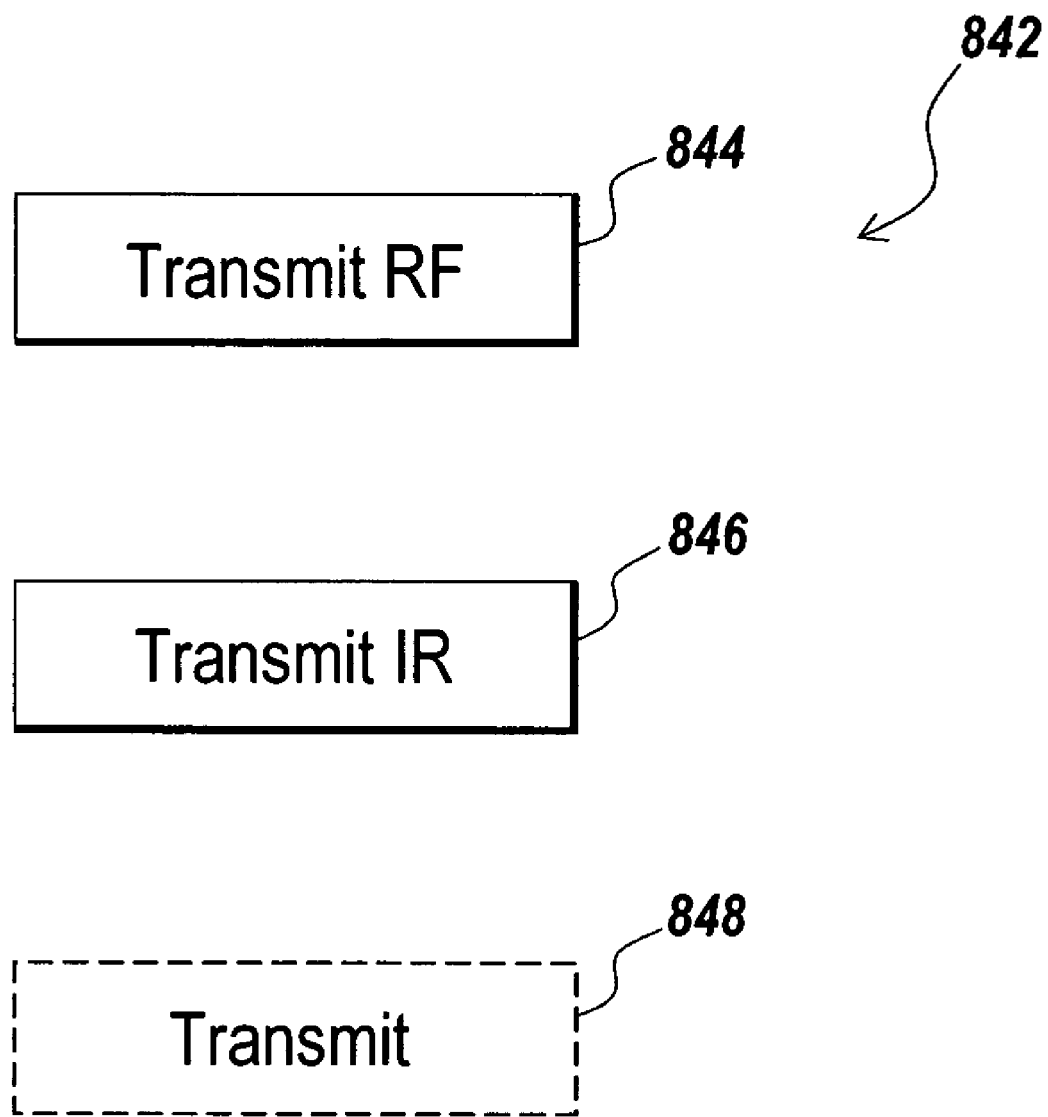

FIGS. 5A, 5B and 5C illustrate, according to various embodiments of the invention, various examples of a transmission of signals from the object identifier 800. A first method 802 is illustrated in FIG. 5A according to an embodiment of the invention. An RF power level is set to Pn (step 804). An IR signal is transmitted (step 806). The delay of m seconds then occurs (step 808). An RF signal is transmitted (step 812). A further delay of x seconds occurs (step 814). Pn is then incremented (step 816). This method 802 provides a substantially consistent IR power level, while varying an RF power level. Varying the RF power level may assist in determining a location of the object identifier 800 by enabling the location determining module 14, and in particular the network connection element 900 or location determining module 14 to receive less than all of the RF signals. According to an embodiment of the invention, one or both of the IR and RF signals are also transmitting information. Examples of this information may include the signal strength being transmitted, the period between transmissions, the length of time of the transmissions, various identifiers, corresponding to the object identifier 800, information received from one or more input devices 870 and/or various status information, such as those pertaining to the controller 810 controller sport 820 or other components of the object identifier 800. According to one embodiment of the invention the RF signal is transmitted every ten seconds and the IR signal is transmitted every twenty seconds.

Determination of the frequency and length of the transmissions involves considerations including battery life precision of location, frequency of updates to location, interference among signal transmissions and network traffic.

A further method 822 of an embodiment of the invention is illustrated in FIG. 5B. According to this embodiment, an RF signal is transmitted (step 824) and a delay (step 826) occurs before the next transmission of an RF signal (step 824). Independently of the RF transmission, an IR signal is transmitted (step 828). The IR transmission (step 828) may occur simultaneously with the transmission of the RF signal (step 824) but this embodiment of the invention is not so limited. The transmission of the RF signal (step 828) may occur at any time relative to the transmission of the RF signal step 824. A delay of c seconds step 832, occurs before the next transmission of the RF signal, 828.

According to a further embodiment of the invention, a further method 842 is illustrated by way of example in FIG. 5C. According to this embodiment, an RF signal is transmitted (step 844) and an IR signal is transmitted (step 846). According to an alternative embodiment, a transmission in another medium may also occur (step 848). Examples of other mediums include ultra-sonic (US), visual light, or audible sound. According to the method 842 of FIG. 5C, transmissions may be continuous, variable or occur at regular intervals. The transmissions among various mediums may be synchronized or random relative to transmissions in other mediums.

Figure 6:
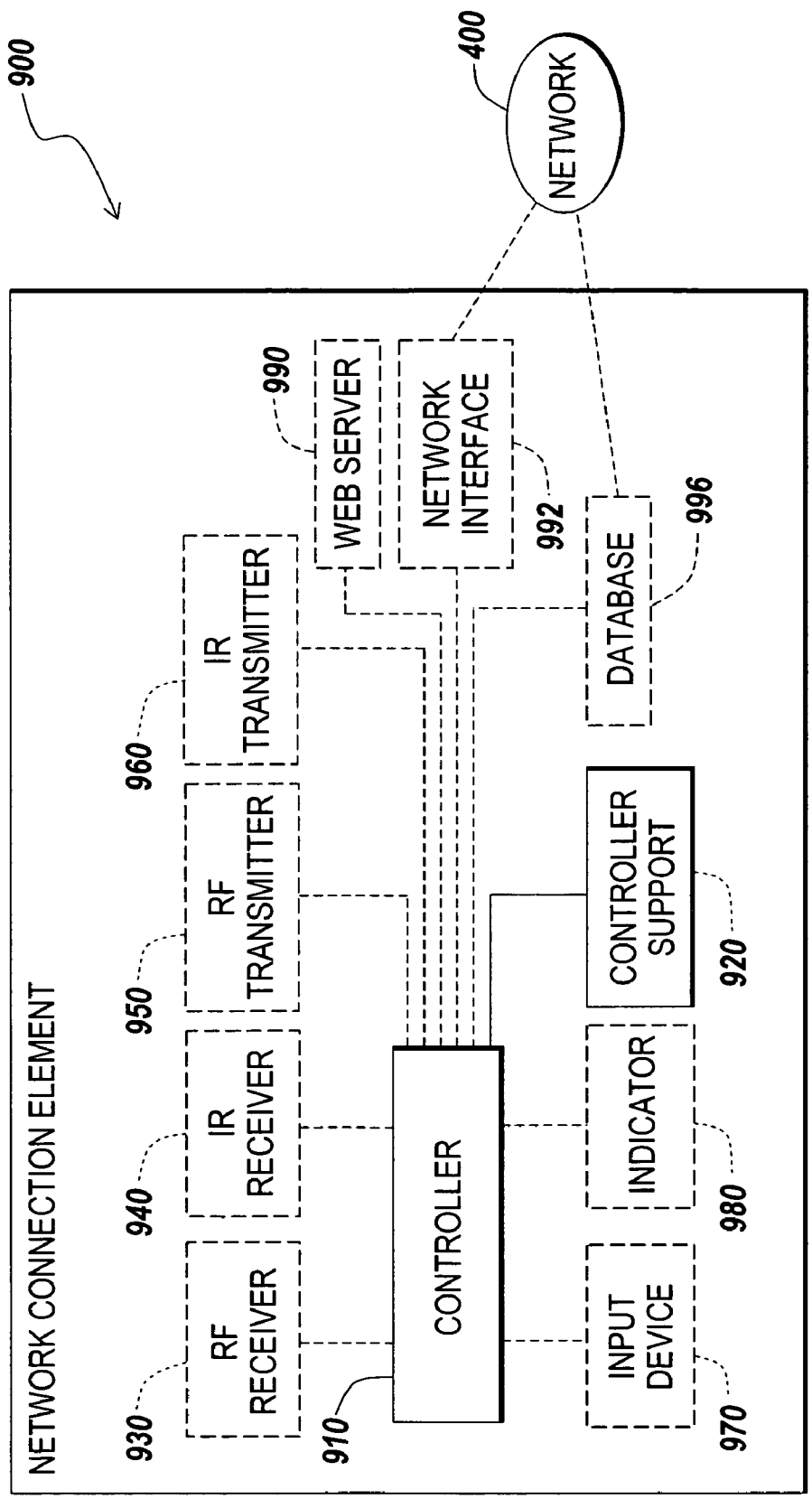
FIG. 6 illustrates a network connection element according to an embodiment of the invention.

An example of a network connection element 900 according to an embodiment of the invention is illustrated in FIG. 6. A network connection element 900 can include one or more components similar to those of the object identifier 800 illustrated by way of example in FIG. 3A. A network connection element 900 is provided with a controller 910 and a controller support 920. Controller support 920 may optionally include non-volatile memory. Optionally, various embodiments of the invention may include one or more of the following in the network connection element 900: an RF receiver 930, an IR receiver 940, an RF transmitter 950, an IR transmitter 960, an input device 970 and/or an indicator 980.

The network connection element 900 is adapted to receive signals from the object identifier 800. According to an embodiment of the invention, the network connection element 900 contains hardware and software capable of receiving signals from other components of the location system, such as an object identifier 800, other network connection elements 900. According to an embodiment of the invention, the network connection element 900 may have network connectivity software, a local web server, object identifier analysis software, software to transmit the results of an object identifier analysis to a remote server, DHCP software and local permanent storage. According to an embodiment of the invention, the network connection element 900 may also include configuration, service and debug applets to be used in the maintenance and configuration of the object identifier 800.

The network connection element 900, according to an embodiment of the invention, may further be provided with a web server 990. As with the web server 340 of the receiver 300 of location system 100, web server 990 of network connection element 900 is able to provide or receive information or commands. In various embodiments of the invention, the web server 990 may allow for control and configuration of any component of the location system.

According to a further embodiment of the invention, the network connection element 900 may be provided with a network interface 992. The network interface 992, as with the network interface 330 of location system 100, is configured to couple the controller to a network 400. According to an embodiment of the invention, the network interface 992 is adapted to packetize buffered information received and send this information as a group, thereby providing more efficient network usage in some applications.

A further embodiment of the invention provides a database 996 in communication with then controller 910 of the network connection element 900. The database 996 may be provided within the network connection element 900 or may be provided on a network 400. According to alternative embodiment of the invention, the database 996 may be provided within the network connection element 900 and also in direct communication with the network 400.

Figure 7:
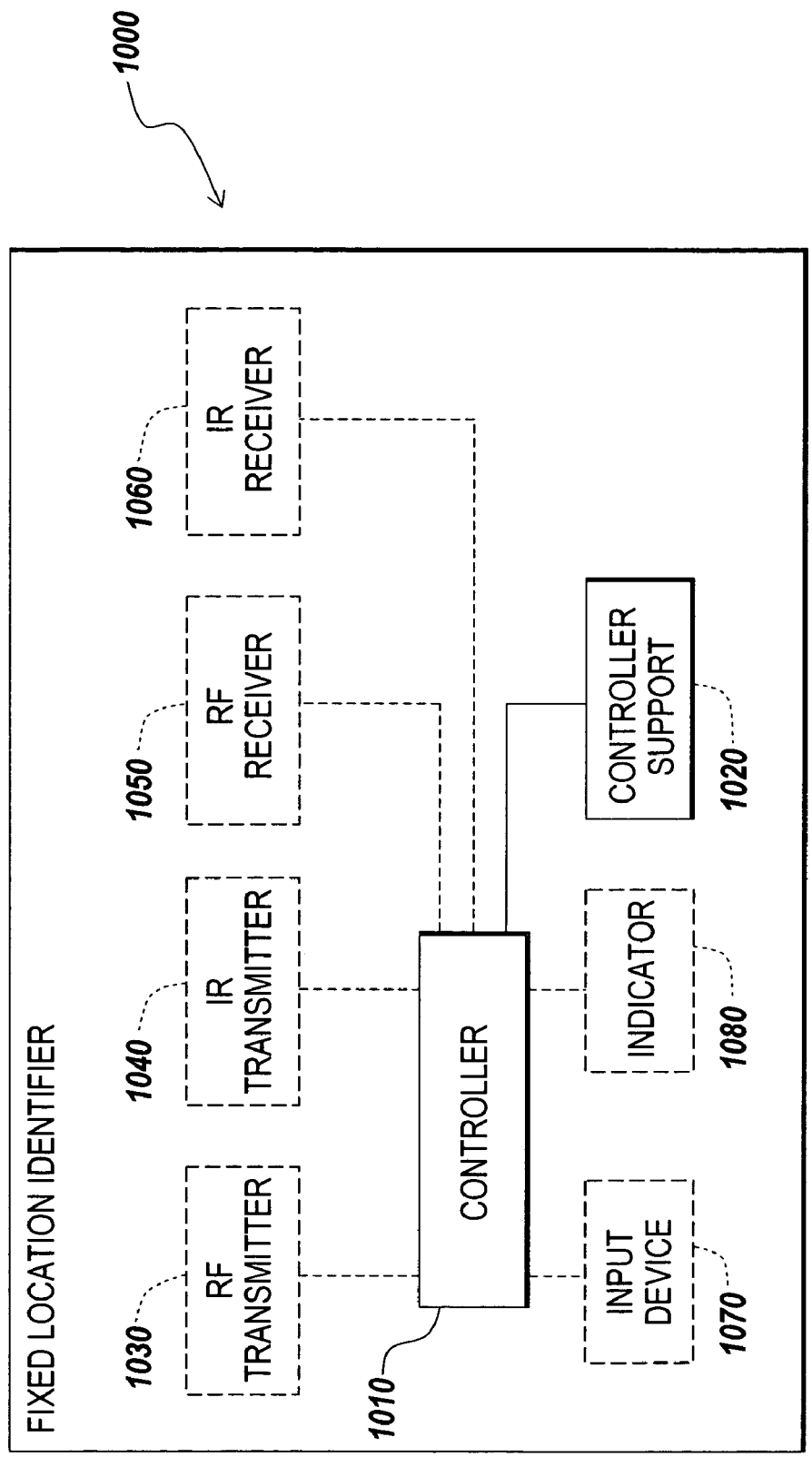
FIG. 7 illustrates a fixed location identifier according to an embodiment of the invention.

The fixed location identifier 1000, according to an embodiment of the invention is illustrated by way of example in FIG. 7. The fixed location identifier 1000 is similar to the object identifier 800 illustrated and described in relation to FIG. 3A. A controller 1010 is provided in communication with controller support 1020. RF and IR transmitters and receivers 1030, 1040, 1050, 1060 may be provided individually or in combination according to various embodiments of the invention. An input device 1070 and indicator 1080 may also each or both be included in various embodiments of the invention. The fixed location identifier 1000 is configured to receive signals from one or more object identifiers 800, and/or other fixed location identifiers 1000, and retransmit these signals to a network connection element 900 along with identifying information to designate which of the fixed location identifiers 1000 is retransmitting the information. Additional information relating to the retransmitting fixed location identifier 1000 may also be appended, such as battery information or other status information allowing remote monitoring of the fixed location identifier 1000.

According to various embodiments of the invention, the fixed location identifier 1000 may be provided with input devices 1070 or indicators 1080 to enable input information or various signaling functionality. Fixed location identifiers 1000 do not need to be coupled to other components by the use of wiring or other infrastructure. Therefore, the use of fixed location identifiers 1000 enable a location system to be implemented with fewer network connection elements, as fixed location identifiers can provide additional information as to the location of object identifiers 800. Furthermore, fixed location identifiers 1000, can extend the range of network connection elements 900 by providing an optional higher power transmission signal to reach network connection elements 900 at ranges that object identifiers 800 may be incapable of reaching.

The network connection element 900 is adapted to receive signals from the fixed location identifier 1000 as described above in relation to signals from the object identifier 800. According to an embodiment of the invention, the network connection element 900 contains hardware and software capable of receiving signals from the fixed location identifier 1000. According to an embodiment of the invention, the network connection element 900 may have network connectivity software, a local web server, fixed location identifier software, software to transmit the results of a fixed location identifier analysis to a remote server, DHCP software and local permanent storage. According to an embodiment of the invention, the network connection element 900 may also include configuration, service and debug applets to be used in the maintenance and configuration of the fixed location identifier 1000.

Figure 8:
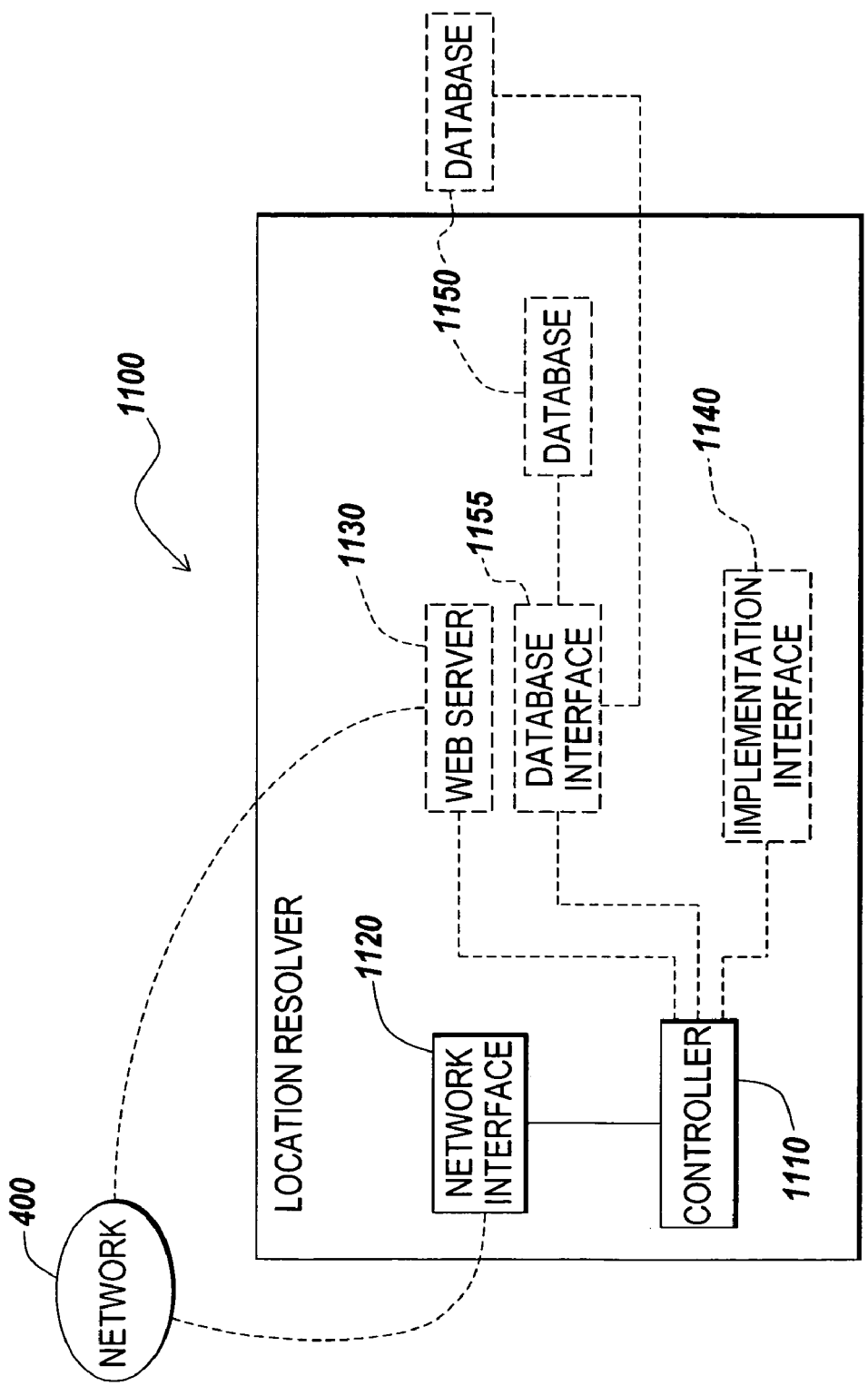
FIG. 8 illustrates a location resolver according to an embodiment of the invention.

The location resolver 1100, according to an embodiment of the invention, is illustrated by way of example in FIG. 8. As shown in FIG. 8, a controller 1110 is provided in communication with a network interface 1120. The network interface 1120 is adapted to be coupled to the network 400. Controller support may also be optionally provided. A web server 1130 is provided in communication with a controller 1110. The web server 1130 of the location resolver 1100 is similar to the web server 990 of the network connection element 900, discussed herein.

According to an embodiment of the invention, the location resolver 1100 may be provided with a configuration capability to configure other components of the location system. For example, an embodiment of the location resolver 1100 may perform some or all of the following functions: reset system time; reset communications; disable all or selected input devices of all or selected components, such as object identifiers, fixed location identifiers, network connection elements; establish and/or cancel associations between all or selected components; establish and/or cancel privacy settings for specific location information; configure network communication protocols; configure receiver and/or transmitter configurations, altering or eliminating signals, signal types, such as RF, IR, ultrasonic, or the like, or transmission frequencies and the frequencies at which transmissions are expected; receive information on the location of the object identifier; determine or calculate the location of the object identifier 800.

An implementation interface 1140 is also provided in communication with controller 1110. The implementation interface 1140 is provided to communicate with other devices in order to allow for the communication of location information and/or initiation or response to commands as described herein. Various examples of implementation interfaces 1140 include XML and SMTP protocols, other examples may be apparent to those of ordinary skill in the art.

A database 1150 is also provided either within the location resolver 1100 or external the location resolver 1100. The database 1150 is adapted to store information relating to the location of one or more object identifiers 800 and/or optional fixed location identifiers 1000 and/or network connection elements 900. According to various embodiments of the invention, the database 1150 may store current and/or previous location and status information of location system components, associations of location system components with each other or locations, privacy protocols and status, topology data indicating locations of some or all location system components relative to each other, or in other descriptive terms, such as room or location names or by a coordinate system.

A database interface 1155 may be provided in another embodiment of the invention in order to facilitate interaction between the database 1150 and the controller 1110. The database interface 1155 may be a network or other hardware or software to controller 1110 to enable the controller 1110 to access the database 1150. Various examples of database interfaces 1155 include JDBC and ODBC, other examples may be apparent to those of ordinary skill in the art.

A method 1102 of operation of the location resolver 1100, according to an embodiment of the invention is illustrated in FIG. 9A. The location resolver 1100 initially waits for input from a receiver, such as the network connection element 900 (step 1104). The location resolver 1100 then determines whether an IR signal is received (step 1106). If an IR signal is received, data received from the transmitter and receiver's location is made available (step 1108). If an IR signal is not received, the location resolver 1100 checks to see if an RF signal is received (step 1112). Location resolver 1100 also checks to see if an RF signal is received after making any data available from the reception of an IR signal available. If an RF signal is not received, the location resolver 1100 according to an embodiment of the invention returns again to wait for further input from the network connection element 900. If an RF signal is received, the location resolver 1100 determines the strength of the received RF signal using the peak picking method provided in the illustrative embodiment of the present invention (step 1113). The peak picking method will be described below in more detail with reference to FIGS. 9B-10C. If the strength of the received RF signal is determined, the location resolver 1100 determines whether the RF signal power is high (step 1114). If so, data received from the transmitter is made available with a message indicating that the object identifier is within a large radius of the network connection element 900 (step 1116). If the RF signal power is not high, the location resolver 1100 determines whether the RF signal power is medium (step 1118). If so, data received from the object identifier is made available with a message that the object identifier is within a smaller radius of the network connection element 900 (step 1122). If the RF signal power is not medium, the location resolver 1100 determines whether the RF signal power is low (step 1124). If so, data from the object identifier 800 is made available with an indication that the object identifier is within a smaller radius of the network connection element 900 (step 1126). The location resolver 1100 then returns to await further input from one or more of the network connection elements 900 (step 1104).

It is understood that the method of FIG. 9 may be accomplished by using transmitters or object identifiers that vary in output power or by constant power output transmitters. In using constant power output transmitters, received signal strength is categorized according to signal strength, such as by the use of a histogram. According to an embodiment of the invention, the network connection element 900 classifies signal strength within specific ranges and may pass an indication of the appropriate range to other location system components. According to another embodiment of the invention, the network connection element 900 provides a signal strength value that may be passed to other location system components, such as the location resolver 1100, allowing more precise analysis of received signal strength information.

According to one embodiment of the invention, RF and IR signal strength are adjusted to a range of approximately 20 feet. Other embodiments of the invention may involve adjusting signal strength of RF and/or IR and/or other signal types, such as ultrasonic, ranges to a few inches, feet, thousands of feet, or miles. Another embodiment of the invention involves varying signal strength among various types of object identifiers.

A method of operation of the location resolver 1100 involves multilateration. Multilateration determines location by determining range from a relative location. Multilateration can be performed by a single receiver, but is best accomplished by multiple receivers. An object can infer the location of another object by calculating its range from one or more beacons with known locations using some type of signal measurement. According to an embodiment of the invention RF signal strength is used to determine location. The illustrative embodiment of the present invention provides a consistent, isotropic radiation pattern from the object identifier. The isotropic radiation pattern described above with reference to FIGS. 4E and 4G enables the signal strength from the object identifier to be the same independent of the orientation of the object identifier. The consistent signal strength enables objects of all types and materials to be accurately tracked independently of mounting the object identifier on conductive objects.

According to a further embodiment both RF and IR are used to determine location. It is understood that an absence of a signal that is expected is considered a signal for purposes of determining location. For example, receipt of an RF signal but not an IR signal may indicate a transmitter is out of IR range but within RF range, or just out of line-of-sight if required for lower-powered IR transmissions. The receiver may be configured to expect both RF and IR transmissions at specific intervals generally or for a specific transmitter. This is one example of the use of both RF and IR for determination of location.

In addition to current signal information, other information may be used in determining location. Previous location information may also be used in determining current location. Locations of other location system components may also be used in determining location. For example, locations of one or more network connection elements 900, one or more fixed location identifiers 1000 and other object identifiers 800 may be used in determining location of a particular location system component. According to one embodiment, establishing relative distances between additional nearby components and the component for which location information is desired assist in establishing a location with greater particularity.

According to an embodiment of the invention, transmission rates may vary among different types of object identifiers. Transmission rates may be adjusted in relation to the type of object for which location information is desired. Examples include low transmission rates for objects typically stationary, such as equipment typically found in a particular room. Whereas people, or mobile equipment may be better tracked by more frequent signal transmissions.

Another method of determining location involves at least one Bayesian network. A further method of determining location involves triangulation. An example of one or more of the foregoing methodologies are described, for example, in U.S. Pat. No. 5,774,876, which is incorporated herein by reference. Bayesian networks are also described in Castro, Paul et al. "A Probabilistic Room Location Service for Wireless Networked Environments" In: *Ubicomp* 2001: *Ubiquitous Computing, Third International Conference*, Atlanta, Ga. USA. Sep. 30-Oct. 2, 2001 *Proceedings*. Edited by G. D. Abowd, et al. Heidelberg, Germany: Springer-Verlag, 2001, LNCS 2201, p. 18 ff. This publication is incorporated herein by reference. Combinations of these methods or other methods of location determination may be apparent to one of ordinary skill in the art and are included within the scope of the invention.

Privacy conditions may be established regarding location information for one or more location system components. Privacy may be accomplished in a variety of ways. For example, privacy may be accomplished by not making location information available or by not determining location information. Privacy may be managed by an opt-out protocol, requiring an action to establish privacy. Privacy may be managed by an opt-in protocol, requiring an action to cancel privacy. A not-opt-out protocol may also be used, preventing action from establishing privacy. Various protocols may be used in combination within a location system. Different location system components may subject to different protocols. Examples include various groups of object identifiers being subject to different protocols, such as some people able to select a privacy protocol or a privacy status, such as privacy or no privacy, while object identifiers used to locate equipment may be subject to a not-opt-out protocol. According to an embodiment of the invention, protocols or privacy status may be assigned through a batch-processing capability in a user interface. According to another embodiment, privacy status for opt-in or opt-out protocols may be accomplished by an input device incorporated in the location system component. Optionally, privacy status may be confirmed by an indicator incorporated in the location system component.

Associations associating objects with other objects or with locations may be established. Examples of the use of associations include: determining procedure times, room utilization, proximity alerts that may be used to alert a fall of a person, regulatory compliance, person & equipment associations, location & equipment associations, friend & foe associations, and automatic billing. According to an embodiment of the invention, association information may be stored in a database. Associations may be performed through a batch-processing capability in a user interface. According to another embodiment, associations may be accomplished by an input device incorporated in the location system component. Optionally, association status may be confirmed by an indicator incorporated in the location system component. One example involves activating an input device on an object identifier, fixed location identifier or network connection element. An indicator indicates, such as by an LED or sound, that association can be performed. An input device may then be activated within a limited time on another location system component, such as an object identifier, to establish an association between the components.

Events or actions may be initiated based on location information association information or input device status, or changes in any of these. One example involves sending information in response to an object identifier being within a range of locations or a specific location. An example includes paging a doctor when a specific patient enters a treatment area. Other examples of actions include entering information in a database, sending XML data containing the current location data and status of a location system component onto the network. An example is the use of a cardiac monitoring application typically used in a health care institution for receiving a report of a cardiac arrest. The term health care institution, as used herein, includes a wide variety of facilities associated with providing health care or services. Examples include hospitals, managed care facilities, assisted care facilities and clinics. The location system according to an embodiment of the invention may be configured to receive a request for the location of a particular patient, or the cardiac monitoring equipment sounding the alarm. The location system can then automatically reply with location information to assist health care institution staff in locating the patient in need. A similar example could use the activation of an input device on an object identifier as a distress call by a patient, with the alert and location information forwarded to a health care institution communication system for prompt attention by health care institution staff. One embodiment of the invention may interface with a Winegard interface to unlock a door, or activate other security equipment, in response to location information or input device status. Other examples include pages, WAP messages, sending e-mails and activating or canceling alarms.

According to an embodiment of the invention, the components of the location system do not retransmit signals if they are not received. By waiting until the next scheduled transmission, transmissions throughout the location system area are reduced and interference difficulties are reduced.

FIG. 9B is a flow cart showing an exemplary operation of the location resolver 1100 to determine the strength of the received RF signal. In the illustrative embodiment of the present invention, the location of the object identifier 800 is calculated based on a received signal strength indication (RSSI). The RSSI is a function of distance and a path-loss factor:

$$RSSI = 1/d^{-f}$$

where d is distance and f is the factor.

If the location resolver 1100 receives the signal, it may include multiple paths fading of the signal (step 1132). Fading refers to the variation (with respect to time) of the amplitude or relative phase, or both, of one or more of the frequency components of the received signal. FIG. 10A depicts an exemplary received signal that reflects the multiple paths fading of the signal. The multiple paths fading may occur because the same signal wave travels over multiple paths between the object identifier 800 and the network connection element 900, especially indoors. The exemplary signal depicted in FIG. 10A shows that the multiple paths wave sometimes arrives at the network connection element 900 in-phase (constructively) and sometimes out-of-phase (destructively).

FIG. 10B depicts the exemplary received signal on which a sampling window 1001 is placed, as illustrated by step 1134 of FIG. 9B. The sampling window 1001 may be selected to be small relative to the length of the time interval by which the object identifier transmits the RF signals in the illustrative embodiment. In the illustrative embodiment, the RF signals are received every ten seconds as described above with reference to FIGS. 5A-5C. In the example depicted in FIG. 10B, the sampling window 1001 is selected to have a 0.5 millisecond (msec) width. One of skill in the art will appreciate that the sampling window 1001 is illustrative and the width of the sampling window 1001 can be different in other embodiments depending on the time that the received signal lasts.

Referring back to FIG. 9B, the location resolver 1100 then determines the peak value of the RSSI as a function of time within the sampling window 1001 (step 1136). The peak values can be determined, for example, by taking the derivative of the RSSI. FIG. 10C depicts the exemplary received signals in which peak values 1003, 1005 and 1007 of the received RF signal are determined with the sampling window 1001. The peak values 1003, 1005 and 1007 in FIG. 10C indicate that the object identifier 800 to be located is moving. The highest peak value 1007 within the sampling window 1001 is then used in subsequent location calculations, such as multilateration and triangulation, that are described above with reference to FIG. 9A (step 1138). Although the highest peak value of the received RF signal is not the true RSSI, it has a slight offset that can be easily calculated out. For example, FIG. 10C show that the maximum RSSI value within the sample window is approximately +7 dBm. Within the same sampling window 1007, the instantaneous RSSI varied between −38 dBm and +7 dBm. This +7 dBm value is used in subsequent location calculations.

An advantage of the present invention is that the illustrated location system reduces or eliminates the variability of the RSSI when the highest peak value is used in a subsequent location calculation than when an instantaneous value is used. Another advantage of the illustrative embodiment of the present invention is that the illustrative embodiment of the present invention can work with existing RSSI-based location systems. Also, the location system of the illustrative embodiment of the present invention is simple and easy to implement.

One of ordinary skill in the art will appreciate that the peak picking method of the present invention may apply to a single packet data and across multiple packet data in different embodiments. One of ordinary skill in the art will also appreciate that the peak picking method of the present invention may apply to continuous signals as well as discrete signals.

The peak picking method or technique of the present invention can be used in conjunction with various transmission and/or reception schemes, such as one or more of a space diversity technique, a time diversity technique and a polarization diversity technique. FIG. 9C is a flow chart illustrating that the peak picking method or technique of the present invention is used in conjunction with a space diversity technique. In this example, the location determining module 14 can receive the signal transmitted from the object identifier 800 in a space diversity technique (step 1142). The space diversity is a method of transmission or reception, or both, in which the effects of fading are minimized by the simultaneous use of two or more physically separated antennas, ideally separated by one or more wavelengths. If the signal is received using the space diversity technique, the strength of the signal is determined using the peak picking method or technique of the present invention described above in step 1113 of FIG. 9A. For example, in the space diversity technique, the peak picking method or technique can be applied to the signals received by each of the antennas. The peak picking method compares these two signals, and selects a better signal, for example, a signal having a higher peak value.

FIG. 9D is a flow chart illustrating that the peak picking method or technique of the present invention is used in conjunction with a time diversity technique. In this example, the location determining module 14 can receive the signal transmitted from the object identifier 800 in a time diversity technique (step 1144). In the time diversity technique, signals representing the same information are sent over the same channel at different times. The time diversity is often used over systems subject to burst error conditions, and at intervals adjusted to be longer than an error burst. If the signal is received using the time diversity technique, the strength of the signal is determined using the peak picking method or technique of the present invention described above in step 1113 of FIG. 9A.

FIG. 9E is a flow chart illustrating that the peak picking method or technique of the present invention is used in conjunction with a polarization diversity technique. In this example, the location determining module 14 can receive the signal transmitted from the object identifier 800 in a polarization diversity technique (step 1146). The polarization diversity is a diversity transmission and reception wherein the same information signal is transmitted and received simultaneously on orthogonally polarized waves with fade-independent propagation characteristics. If the signal is received using the time diversity technique, the strength of the signal is determined using the peak picking method of the present invention described above in step 1113 of FIG. 9A.

One of skill in the art will appreciate that the peak peaking method or technique of the present invention can be used in conjunction with the combination of two or more diversity techniques described above.

A location system 720, according to a further embodiment of the invention, is illustrated by way of example in FIG. 11. The location system 720 includes various object identifiers 800, network connection elements 900 and fixed location identifiers 1000. A network 400 is illustrated along with a database 1150 and location resolver 1100. According to the present embodiment, a topology database 1152 is separately provided from the database 1150. The topology database 1152 may be provided with information pertaining to the locations of network connection elements 900 and fixed location elements 900 and fixed location identifiers 1000. Such topology information allows for more descriptive data to be provided regarding the location of object identifiers 800. For example, the location of a fixed location identifier 1000 or network connection element 900 may be specified as a particular office, hallway or area. Therefore, if an object identifier 800 is identified as within a small radius of a fixed location identifier 1000 or network connection element 900, the object identifier 800 may be identified as being within a specific room, office or area.

An electronic device 1101 is provided to host the location resolver 1100. According to this embodiment the location resolver 1100 is in the form of software operating on the electronic device 1101. Examples of electronic devices 1101 include computers, processors or other devices capable of implementing the functionality of the location resolver 1100.

As shown by way of example, a location determining module 14, according to an embodiment of the invention, is illustrated, by way of example, as including one of the fixed location identifiers 1000, the network 400, the electronic device 1101, the location resolver 1100, the database 1150 and topology database 1152.

An example of a location system in use in a health care institution setting is illustrated in FIG. 12. As shown by way of example in FIG. 12, a network 400 is provided to allow for communication among multiple network connection elements 900. A location resolver 1100 is also provided in communication with the network 400. It is noted that the network is not limited to a wired network, as the network may be a wireless network. A fixed location identifier 1000 is illustrated and is in communication with the network connection elements 900. Various object identifiers 800 are illustrated as a fixed to various pieces of equipment within the health care institution setting. The object identifiers 800 may be in communication with one or more of each of the network connection elements 900 and the fixed location identifier 1000.

As illustrated in FIG. 13, a network interface 992, 1120 is shown by way of example according to an embodiment of the invention. The network interface 992, 1120 may be used in one or more of the network connection elements 900 and/or location resolver 1100 or other components adapted for communication with a network. A network interface 992, 1120 is adapted to be directly coupled to a network. The network interface 992, 1120 may be configured with one or more of the appropriate configurations for the corresponding networks. For example, it is illustrated by way of example in FIG. 13, the network interface 992, 1120 may be configured to be directly to an Ethernet network by way of Ethernet circuitry 994. According to a further embodiment, the network interface 992, 1120 may be coupled to a telephone system to a modem 996. According to another embodiment of the invention, the network interface 992, 1120 may be provided with one or more of a cable television modulator 998 to allow communication with a cable T.V. network, a UTP network card 1002, to allow communication with a UTP network, or a universal serial bus (USB) card 1004 and/or a medical telemetry transmitter 1006 for communication with a medical telemetry network.

The present invention has been described by way of example, and modifications and variations of the described embodiments will suggest themselves to skilled artisans in this field without departing from the spirit of the invention. Aspects and characteristics of the above-described embodiments may be used in combination. The described embodiments are merely illustrative and should not be considered restrictive in any way. The scope of the invention is to be measured by the appended claims, rather than the preceding description, and all variations and equivalents that fall within the range of the claims are intended to be embraced therein.

What is claimed is:

1. An object identifier for identifying a location of an object in a location system, the object identifier comprising:
   a horizontal circuit board formed on a first plane for a circuitry of the object identifier, and
   a vertical loop antenna formed on a second plane,
   wherein the first plane is substantially perpendicular to the second plane,
   wherein the object identifier is attached to the object and radiates a signal including information on the location of the object.

2. The object identifier of claim 1, wherein if the object identifier is attached to a surface of the object, the surface is substantially parallel to the first plane.

3. The object identifier of claim 1, wherein if the object identifier is attached to a surface of the object, the surface is substantially vertical to the second plane.

4. The object identifier of claim 1, wherein the signal comprises an RF signal.

5. The object identifier of claim 1, wherein the information on the location of the object comprises information on a strength of the signal radiated from the object identifier.

6. An object identifier for identifying a location of an object in a location system, the object identifier comprising:
- a folded loop antenna formed to have at least a first loop plane and a second loop plane,
- wherein the first loop plane is extended and folded to form the second loop plane,
- wherein the object identifier is attached to the object and radiates a signal including information on the location of the object.

7. The object identifier of claim 6, wherein the folded loop antenna further comprises a third loop plane and the third loop plane is formed by extending and folding the first loop plane.

8. The object identifier of claim 7, wherein the second and third loop planes are further extended and folded to include fourth and fifth loop planes, respectively.

9. The object identifier of claim 7, wherein the object identifier is attached to a surface of the object that is substantially vertical to the first loop plane, the second loop plane and the third loop plane.

10. The object identifier of claim 6, wherein the signal comprises an RF signal.

11. The object identifier of claim 6, wherein the information on the location of the object comprises information on a strength of the signal radiated from the object identifier.

12. A location system for determining a location of an object, the location system comprising:
- an object identifier coupled to the object for transmitting a signal;
- a location determining module for receiving the signal transmitted from the transmitter,
- wherein the object identifier includes a horizontal circuit board formed on a first plane for a circuitry of the object identifier and a vertical loop antenna formed on a second plane, wherein the first plane is substantially perpendicular to the second plane.

13. The system of claim 12, wherein the signal comprises an RF signal.

14. The system of claim 12, wherein the location determining module determines a location of the object based on the strength of the signal received by the location determining module.

15. The system of claim 12, wherein the location determining module comprises a receiver for receiving the signal transmitted from the object.

16. The system of claim 12, wherein the location determining module comprises a location resolver for determining a location of the object using a highest peak value of the signal within a sampling window defined with respect to time.

17. The system of claim 12, wherein the location determining module comprises a network connection element for receiving the signal transmitted from the object.

18. The system of claim 12, wherein the location determining module comprises a network for receiving the signal and determining a location of the object using the signal.

19. The system of claim 18, wherein the network determines a strength of the signal based on a highest peak value of the signal within a sampling window defined with respect to time.

20. A location system for determining a location of an object, the location system comprising:
- an object identifier coupled to the object for transmitting a signal;
- a location determining module for receiving the signal transmitted from the transmitter,
- wherein the object identifier includes a folded loop antenna formed to have at least a first loop plane and a second loop plane, wherein the first loop plane is extended and folded to form the second plane, and the first and second loop planes are substantially perpendicular to a surface of the object where the object identifier is placed.

* * * * *